US006950747B2

(12) United States Patent
Byerly

(10) Patent No.: US 6,950,747 B2
(45) Date of Patent: Sep. 27, 2005

(54) METHODS OF PROCESSING MAGNETOTELLURIC SIGNALS

(76) Inventor: Kent Byerly, 822 Devonport La., Seabrook, TX (US) 77586

( * ) Notice: Subject to any disclaimer, the term of this patent is extended or adjusted under 35 U.S.C. 154(b) by 38 days.

(21) Appl. No.: 10/354,274

(22) Filed: Jan. 30, 2003

(65) Prior Publication Data

US 2004/0153246 A1 Aug. 5, 2004

(51) Int. Cl.[7] .................................................. G06F 19/00

(52) U.S. Cl. ................................. 702/6; 702/7; 702/13; 702/18; 324/76.11; 324/348; 324/350; 343/719; 181/122

(58) Field of Search ............................ 702/5–7, 13, 18, 702/127, 191; 324/348, 350, 76.11; 343/719; 181/122

(56) References Cited

U.S. PATENT DOCUMENTS

| | | | | |
|---|---|---|---|---|
| 3,514,693 A | | 5/1970 | Cagniard | |
| 3,828,241 A | | 8/1974 | Horichi | 323/22 |
| 3,986,207 A | | 10/1976 | Gerbel et al. | 360/6 |
| 4,286,218 A | | 8/1981 | Bloomquist et al. | 324/350 |
| 4,349,781 A | | 9/1982 | Vozoff | 324/346 |
| 4,449,099 A | * | 5/1984 | Hoehn | 324/350 |
| 4,473,800 A | | 9/1984 | Warner | 324/349 |
| 4,591,791 A | | 5/1986 | Bostick, Jr. | 324/350 |
| 4,617,518 A | | 10/1986 | Srnka | 324/365 |
| 4,663,593 A | | 5/1987 | Nekut, Jr. | 324/345 |
| 4,686,475 A | | 8/1987 | Kober et al. | 324/349 |
| 4,686,476 A | | 8/1987 | Ranganayaki | 324/350 |
| RE32,563 E | | 12/1987 | Stolarczyk | 324/334 |
| 4,757,262 A | | 7/1988 | Bostick, Jr. | 324/350 |
| 4,792,761 A | | 12/1988 | King et al. | 324/350 |
| 4,945,310 A | | 7/1990 | Jackson | 324/349 |
| 5,041,792 A | | 8/1991 | Thompson | 324/350 |
| 5,148,110 A | | 9/1992 | Helms | 324/323 |
| 5,327,089 A | | 7/1994 | Ouellette | 324/345 |

(Continued)

OTHER PUBLICATIONS

Robertson, 'The Effect of Wave Number Filtering on Synthetic Three–Dimensional Magnetotelluric Data', 1989, IEEE Article, session 10D3, pp. 289–290.*

Hill et al., 'Electric Field Strength', 1999, CRC Press, pp. 1–13.*

Lakkos et al., 'An Adaptive System for the Estimation of the Magnetotelluric Impedence Tesnor and Its Application in Earthquake Prediction', Dec. 1992, IEEE Article, pp. 1209–1213.*

Robertson, 'The Effect of Wavenumber Filtering on Synthetic Two–Dimensional Magnetotelluric Data', Dec. 1988, IEEE Article, pp. 1056–1059.*

*Primary Examiner*—Patrick Assouad
*Assistant Examiner*—Elias Desta
(74) *Attorney, Agent, or Firm*—Keith B. Willhelm

(57) ABSTRACT

A method for processing magnetotelluric signals to identify subterranean deposits is provided for. The methods comprise obtaining magnetotelluric data from an area of interest. The magnetotelluric data comprises the amplitude of magnetotelluric signals recorded over time at one or more defined locations in the area of interest. The data for each location then is filtered through a set of frequency filters. The frequency filters correspond to subterranean depths over a range of interest. Amplitude peaks in the filtered data then are identified and analyzed to determine a value correlated to the resistance of the earth at each frequency and location. The resistance values are indicative of the presence or absence of deposits at the corresponding subterranean depth. Preferably, the amplitude data is power normalized across all locations in the survey, a gain factor is applied to the resistance values to scale the values for depth variation, and the resistance values are displayed as a depth-location plot for interpretation.

52 Claims, 14 Drawing Sheets

U.S. PATENT DOCUMENTS

| | | | | | |
|---|---|---|---|---|---|
| 5,373,443 | A | | 12/1994 | Lee et al. | 364/420 |
| 5,439,800 | A | | 8/1995 | Thompson | 435/9 |
| 5,671,136 | A | * | 9/1997 | Willhoit, Jr. | 702/18 |
| 5,770,945 | A | | 6/1998 | Constable | 324/350 |
| 5,777,478 | A | | 7/1998 | Jackson | 324/348 |
| 6,087,833 | A | | 7/2000 | Jackson | 324/348 |
| 6,191,587 | B1 | | 2/2001 | Fox | 324/350 |
| 6,462,549 | B1 | | 10/2002 | Curtis et al. | 324/323 |

* cited by examiner

METHODS OF PROCESSING MAGNETOTELLURIC SIGNALS

BACKGROUND OF THE INVENTION

The present invention relates to magnetotelluric surveys and, more particularly, to improved methods for processing magnetotelluric signals.

There are many different methods for locating hydrocarbon deposits, ore bodies, water, and other natural resources in the earth's crust. Drilling test holes in an area of interest is the most direct method. Samples from various depths may be obtained and analyzed for evidence of commercially exploitable deposits. Test drilling, however, is extremely expensive and time consuming. Thus, it is rarely a practical option for exploring unknown and unproven areas.

Seismic surveys are one of the most important techniques for discovering the presence of hydrocarbon deposits. A seismic survey is conducted by deploying an array of energy sources, such as dynamite charges, and an array of sensors in an area of interest. The sources are discharged in a predetermined sequence, sending seismic energy waves into the earth. The reflections from those energy waves or "signals" travel through the earth, reflecting or "echoing" off various subsurface geological formations. Inferences about the depth of those formations may be made based on the time it takes the reflection signals to reach the array of sensors.

If the data is properly processed and interpreted, a seismic survey can give geologists an accurate picture of subsurface geological features. Seismic surveys, however, only identify geological formations capable of holding hydrocarbon deposits. They do not reveal whether hydrocarbons are actually present in a formation, nor do they provide information from which one may infer the presence of metallic ores. Moreover, the time and expense involved in conducting a seismic survey, while considerably less than that of test drilling, is nevertheless substantial.

Geological surveys also have been based on the detection and interpretation of magnetotelluric signals. Magnetotelluric radiation emanates from the earth and may be caused by current flow in the upper layers of the earth's crust. The current flow in turn creates electromagnetic fields adjacent to, but above the earth's surface that are directly related to the resistivity of the earth through which the induced current is flowing. That resistivity in turn may be used to infer the presence or absence of valuable deposits. For example, areas of increased resistivity may indicate the presence of hydrocarbons since hydrocarbons are poor conductors. Areas of lower resistance may indicate the presence of valuable metal ores which are relatively good conductors.

Magnetotelluric surveys also are much less expensive than seismic surveys. There is no need to install an array of sources and receivers across what may be a very substantial area to be surveyed as in seismic surveying. Instead, magnetotelluric detection equipment and recorders may be carried across the survey area by truck, all-terrain vehicle, helicopter, or other mode of transportation suitable for the survey area.

Despite the considerable theoretical and practical advantages of magnetotelluric surveying, however, its promise has not been fully realized, so much so that such surveys are often met with the skepticism normally reserved for water witching, divining and the like. That perception has been created in large part because many conventional magnetotelluric methods are based on converting magnetotelluric signals into audio signals that are then aurally interpreted by an operator. Obviously, the reliability and consistency of such methods, to the extent they exist at all, is dependent on the ability of the operator to hear differences in the signals and to properly interpret them.

Other methods have focused on detection and interpretation of the DC component of magnetotelluric fields. For example, U.S. Pat. No. 4,945,310 to J. Jackson et al. discloses methods based on measuring the potential created across a pair of spaced electrodes. The AC component of the potential is filtered out, leaving a DC potential the magnitude of which is functionally related to the subsurface lithology at the detection site. U.S. Pat. No. 4,473,800 to B. Warner and U.S. Pat. No. 5,770,945 to S. Constable also disclose methods of detecting and analyzing the DC component of magnetotelluric signals using dipole antennas that detect both the magnetic and electrical components of magnetotelluric fields.

The applicability of such methods, however, is severely limited. The presence and strength of DC signals is dependent on the time of day and weather conditions. For example, they are extremely difficult to detect reliably during overcast periods and during rainstorms, and they are almost undetectable at night. More importantly, however, the DC component of magnetotelluric fields has no correlation to depth. Thus, while the DC component may be analyzed to make inferences about the overall resistivity of the earth below a survey location, it is impossible to deduce the resistivity of the earth at specific depths, or to detect differences in resistivity at different depths.

Other methods focus on detecting and interpreting the extremely low frequency AC component of magnetotelluric signals. Such signals typically are below about 3 kHz. There is a direct relationship between a given magnetotelluric frequency and subsurface depth. Thus, the resistivity of the earth at a particular depth is related to the amplitude of the signal at a corresponding frequency. For example, the resistance of a shallow subsurface formation can be measured by detecting and analyzing higher frequency magnetotelluric signals. The resistance of deeper formations can be measured by analyzing lower frequencies.

For example, U.S. Pat. No. 5,777,478 to J. Jackson discloses methods of detecting and analyzing the AC component of magnetotelluric signals. Those methods entail modulating and then demodulating a magnetotelluric signal with a sweep oscillator. The sweep oscillator beats the received signal with a generated signal to generate tuned signals at various frequencies. The tuned signals then are converted to pulses by reference to a threshold value. That is, whenever the tuned signal exceeds a predetermined threshold value a pulse is generated. The number of pulses over a given time period, what is referred to as the "pulse density", is said to provide a measure of conductivity relative to other depths and locations in the survey area.

Magnetotelluric signals, however, are extremely weak and typically are very noisy. Prior art methods have not provided effective methods for improving the quality of magnetotelluric signals, i.e., their signal to noise ratio. Jackson '478, for example, teaches the use of a relatively large bandwidth low-pass filter. Such filters pass a relatively large spectrum and quantity of noise along with the signal to be analyzed.

Jackson '478 also bases its analysis of magnetotelluric signals on "snap shots" of the data. That is, it suggests that the tuned signals generated at each location should not be maintained for long periods of time so as to avoid any fluctuations in the overall strength of the received signal that might introduce unnecessary error in the survey. At the same time, however, the accuracy of the overall survey depends on an unstated, though faulty assumption that the received signals are relatively constant, since data is being collected and analyzed from various locations in the survey at different times. Moreover, by relying on "snap shots" of fluctuating signals, the results of such methods are difficult to replicate from survey to survey.

Thus, to date there has been little success in systematically analyzing magnetotelluric signals despite the availability of quiet detection and recording equipment and efficient and powerful digital computers. Such equipment makes it possible to easily acquire and process large amounts of data. It is believed, therefore, that the lack of success in large part derives from the inability of the prior art to recognize the essentially chaotic nature of magnetotelluric signals and to construct effective models for isolating and identifying meaningful data in magnetotelluric signals. Whatever the reason, the fact is that conventional methods of processing magnetotelluric data have not been sufficiently effective or efficient for magnetotelluric surveying to gain commercial acceptance or widespread use.

An object of this invention, therefore, is to provide improved methods for conducting geological surveys and, more particularly, methods that are relatively inexpensive as compared to test drilling and seismic surveys and yet still accurately identify the presence of hydrocarbons, ore bodies, water, and other natural resources in the earth.

A more specific object of the subject invention is to provide improved methods for processing magnetotelluric signals that may be processed by conventional digital computers and that do not rely on an operator to distinguish differences in a magnetotelluric signal.

It also is an object to provide such methods that more effectively remove unwanted noise and identify and analyze meaningful components of magnetotelluric signals.

Another object of this invention is to provide such methods that more accurately and reliably reflect the relative resistivity of subsurface geology across a survey area, and especially, such methods that do so despite variations in the strength of magnetotelluric signals as the signals are detected and recorded during the course of a survey.

Yet another object is to provide such methods wherein all of the above-mentioned advantages are realized.

Those and other objects and advantages of the invention will be apparent to those skilled in the art upon reading the following detailed description and upon reference to the drawings.

SUMMARY OF THE INVENTION

The subject invention provides for methods of processing magnetotelluric signals to identify subterranean deposits. The methods comprise obtaining magnetotelluric data from an area of interest. The magnetotelluric data comprises the amplitude of magnetotelluric signals recorded over time at one or more defined locations in the area of interest. The magnetotelluric data for each location then is filtered at a set of predetermined frequencies to separate the amplitude data at each of those frequencies from the remainder of the amplitude data for the locations. The predetermined frequencies correspond to subterranean depths over a range of interest. It will be appreciated that filtering the data at defined frequencies not only enables the data to be discriminated on the basis of depth, but that it also significantly enhances the quality of the signal that is ultimately analyzed and interpreted, thereby increasing the accuracy and reliability of the process.

Preferably, the amplitude peaks in the filtered amplitude data then are identified and analyzed to determine a value correlated to the resistance of the earth at each frequency at each location. The resistance values are indicative of the presence or absence of deposits at the corresponding subterranean depth.

Preferably, the amplitude data is power normalized across all locations in the survey, a gain factor is applied to the resistance values to scale the values for depth variation, and the resistance values are displayed as a depth-location plot for interpretation. Such steps enhance the display of the data and aid in its interpretation.

The amplitude peaks may be analyzed by a number of different statistical approaches. Accurate relative resistance values, however, have been derived based on the number of peaks, their amplitudes, and the combination thereof. Preferably the analysis is based on the peaks falling within defined thresholds or defined bins within such thresholds. It will be appreciated that by using appropriate thresholds and bins the signal to noise ratio of the signal may be enhanced significantly, which in turn increases the accuracy and reliability of the resistance values.

Alternate embodiments comprise obtaining magnetotelluric data from an area of interest where the magnetotelluric data comprises the amplitude of magnetotelluric signals sampled over a period of at least 5 seconds at one or more defined locations in the area of interest. The magnetotelluric data for each location is then filtered at a set of predetermined frequencies to separate the amplitude data at each of those frequencies from the remainder of the amplitude data for the locations. The predetermined frequencies correspond to subterranean depths over a range of interest. The filtered data then is analyzed to determine a value correlated to the resistance of the earth at each frequency at each location. The resistance is indicative of the presence or absence of deposits at the corresponding subterranean depth. It will be appreciated that by using relatively long sampling times, naturally occurring variations in the magnetotelluric signal average out and allow sufficient signal integration to improve the signal to noise ratio.

DESCRIPTION OF ILLUSTRATIVE EMBODIMENTS

The subject invention is directed to improved methods for processing magnetotelluric signals to identify subterranean deposits of hydrocarbons, metallic ores, water, and other natural resources having resistivities contrasting with the earth in which they are located. More particularly, the novel methods comprise the step of obtaining magnetotelluric data from an area of interest. The magnetotelluric data comprises the amplitude of magnetotelluric signals recorded over time at one or more defined locations in an area of interest. Those signals comprise information indicative of subsurface resistivities in the survey area as well as unwanted noise. The methods of the subject invention are designed to process such information to remove unwanted noise, to provide values correlating to subsurface resistivity at defined depths, and ultimately, to render a more accurate indication of the presence or absence of valuable deposits in the survey area.

Figure 1:
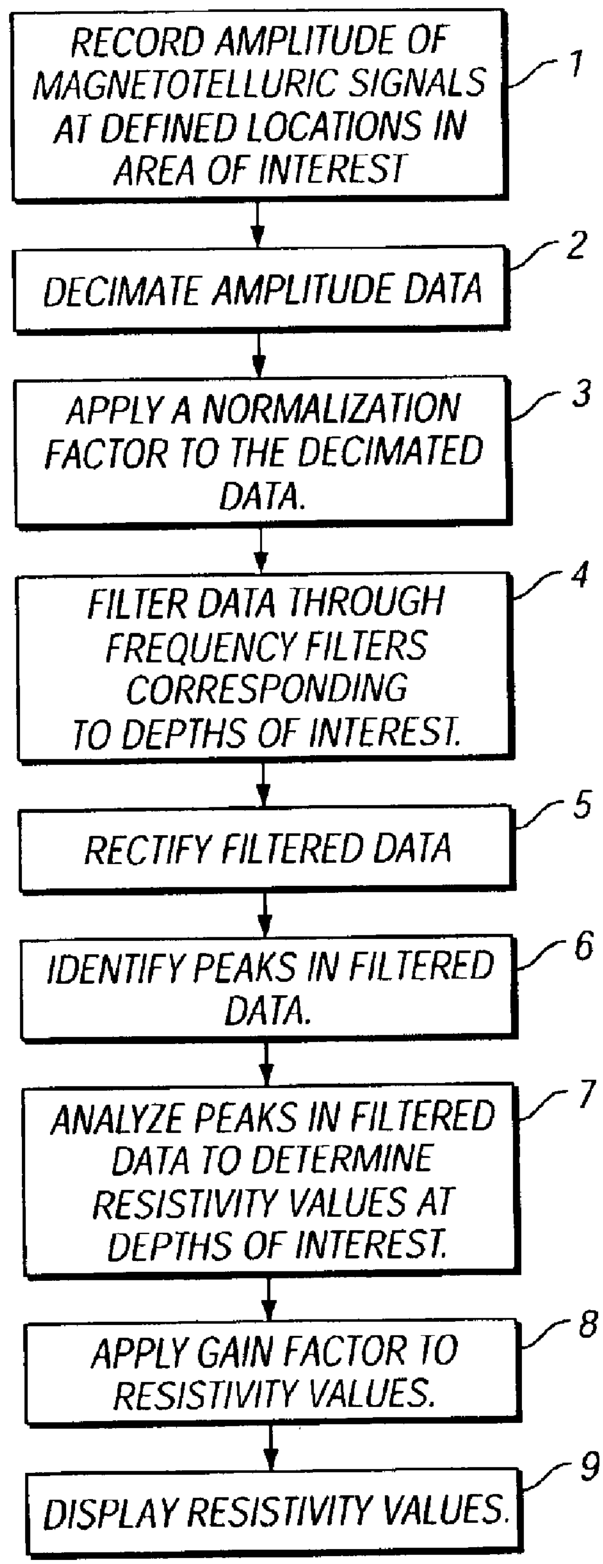
FIG. 1 is a schematic diagram of a preferred embodiment of the methods of the subject invention showing a sequence of steps for processing magnetotelluric signals to determine the relative resistivity of subsurface geology in a survey area.

By way of example, a preferred embodiment of the methods of the subject invention is shown in the flow chart of FIG. 1. As shown therein in step 1, the amplitude of magnetotelluric signals is recorded at various locations in an area of interest. For example, a two-dimensional magnetotelluric survey may be conducted along a survey line traversing the area of interest. Detection and recording equipment may be mounted on a truck, all-terrain vehicle, helicopter, or vehicle, or simply carried from one location to the next, as is suitable for the terrain in the survey area. Magnetotelluric signals are recorded over time at each location on the survey line.

A two-dimensional survey will generate a profile of the subsurface resistivity below the survey line. More commonly, however, the data will be recorded at various locations across a defined area. The data then may be gathered and analyzed as a series of two-dimensional surveys, or assimilated into a three-dimensional survey that will provide a profile of the subsurface resistivity below the survey area.

Magnetotelluric signals may be detected and recorded by conventional equipment commonly employed for such purposes. Typically, such systems will comprise a magnetometer coil or some other antenna system capable of receiving magnetolluric signals. Magnetotelluric signals are typically weak, and therefore, preferred systems will feed the signal from the antenna into a high gain amplifier. The signal then is preferably converted to a digital format by an analog-to-digital (A/D) converter, preferably after first passing the amplified signal through a low-pass filter to remove noise and prevent aliasing effects caused by the analog-to-digital converter. While the signal may be processed in real time, preferably the data then is stored in an appropriate digital storage device for subsequent processing and interpretation.

It is preferred that the sampling rate be substantially greater than the highest frequency of interest in the signal. That assists in preventing the effects of aliasing created when the analog signal is converted to sampled data. At a minimum, as suggested by Nyquist, it should be no less than twice the highest frequency of interest. For example, magnetotelluric signals of interest typically will occur at frequencies below about 3 kHz, and sampling preferably is conducted as high as about 64 kHz, but no lower than about, 6 kHz.

It will be appreciated, however, that there are a variety of systems for receiving, converting, and recording magnetotelluric signals that are known to workers in the art and that may be used to advantage in the subject invention. Because magnetotelluric signals are inherently weak and noisy, it is preferred that relatively quiet equipment be used so as to inject as little system noise as possible into the signal and to ensure detection of the signal. The precise construction or operation of such systems, however, is not part of the subject invention, as the novel methods may be applied to magnetotelluric data obtained by any suitable system.

Similarly, while the preferred method described herein contemplates storage of magnetotelluric data for subsequent processing, systems may be devised for processing data in more or less real time so that the signals may be interpreted, in whole or in part, in the field. Such systems may be preferred as they may provide insights useful in designing the survey itself or in selecting the parameters to be applied in further processing the data for interpretation.

Magnetotelluric signals can vary over time, and distortion from random noise events is more likely to mask meaningful signals over a relatively short period of time. Thus, the signals preferably are recorded at each location over a length of time sufficient to allow such variations to average out and to allow sufficient signal integration to ensure an adequate signal to noise ratio (SNR). Accordingly, the signal preferably is recorded at least about 5 seconds, and more preferably, at least about 20 seconds. Longer recording times have the potential for increasing reliability, but at the same time, the amount of data that must be processed is increased. Thus, in general, a recording time of from about 5 to about 60 seconds, and most preferably, from about 20 to about 60 seconds will be sufficient to significantly improve the signal quality without needlessly increasing the amount of data to be processed. As with the equipment used to record and convert the data, in other respects the precise method of conducting the survey is not part of the subject invention. The factors to be considered in designing a magnetotelluric survey are known to workers in the art, and the novel methods may be used to process data from any such survey.

Because magnetotelluric signals are time variant and subject to random noise, the reliability of the data is increased by increasing the time period over which data is recorded. The sampling rate also preferably is relatively high to assist in removing aliasing effects. The amount of data collected, therefore, may be quite large and greater that the amount of data needed to make accurate inferences. Other factors being equal, more data also means more computing time and expense. Accordingly, especially when processing data in real time in the field, it may be desirable to limit the amount of data with the recognition that, while less accurate, processing of a relatively small portion of the data may provide a faster, cheaper first look at the results of the survey.

Thus, the amplitude data may be decimated, for example, as shown in step 2 of FIG. 1. Decimating the data reduces the amount of data that is processed in subsequent steps of the novel processes and, therefore, reduces processing time and costs. Too much decimation, however, may reduce the reliability of the analysis to a certain extent, and so savings in processing times and costs must be weighed against reduced reliability. The novel processes in their preferred aspects ultimately identify and analyze amplitude peaks in the data, and therefore, if the data is decimated without significantly diminishing the ability to identify peaks in the data, the reliability of the process will not be significantly affected. With that in mind, data typically may be decimated down to an effective sampling rate approximating four times the highest frequency of interest while still substantially preserving the amplitude peaks in the data. Higher decimation rates may be used, however, if for example a relatively less accurate first look at the data is desired.

As noted, signals are recorded over time at various locations in the survey, and each location in the survey usually will be sampled at different times with equipment being transported from location to location. Thus, there may be variations in the amplitude data from location to location that are unrelated to subsurface resistivities. Such variations may result from changes in the magnetotelluric field over time, temperature differences, or changes in the orientation of the antenna. Thus, the amplitude data preferably is normalized across all locations of interest in the survey. While normalization is not necessary for processing and statistically analyzing the data, it does assist in the interpretation of any subsequent visual display of the processed data, such as a display of resistivity across a depth-location plot.

For example, in step 3 of the preferred method shown FIG. 1, a normalizing factor is applied to the amplitude data for each location. Preferably, the normalization factor is based on the signal at the frequency corresponding to zero depth. In theory, the resistivity of the surface of the earth should not vary substantially as a function of location. Thus, assuming that the sampling time of the survey is sufficiently long to allow time variations in the magnetotelluric signal to average out, any differences observed in the magnetotelluric frequency corresponding to the surface (zero depth) in different locations should be attributable to variations unrelated to subsurface resistivities. Those variations may be substantially eliminated by applying a factor to the data for each location that will normalize the signal across all locations at zero depth.

Thus, the signal for each location preferably is filtered at the frequency corresponding to zero depth and the amplitude at that frequency is analyzed. Preferably, the normalization factor is based on the total power recorded at the zero-depth frequency over the sampling period, as that measure tends to average out variations in amplitude over time. For example, the data at each location could be divided by the total power at that location. Alternately, the normalization could be based on the peak amplitude or another statistical measurement of the amplitude at zero depth. Normalization also could be based on analysis of the signal at frequencies corresponding to other depths, e.g., a frequency of 100 Hz which for practical purposes corresponds to infinite depth. It will be appreciated, however, that suitable normalization factors may be derived by other methods consistent with enhancing the display of processed data.

In accordance with the subject invention, the amplitude data for each location is filtered at a set of predetermined frequencies to separate the amplitude data of the signal at each frequency from the remainder of the amplitude data for the location. The frequencies correspond to subterranean depths over a range of interest. The frequency filters also greatly improve the signal to noise ratio. Thus, it is possible to identify and analyze data corresponding to particular depths in the survey area and to do so with greater accuracy.

For example, as shown in step 4 of FIG. 1, the normalized data from step 3 is processed through a set of frequency filters. The center or nominal frequency of each filter is determined by the range of depth to be analyzed and the desired depth resolution for the survey. For example, surveys designed to detect hydrocarbon deposits generally will focus on depths of from about 1,000 to about 15,000 feet. The depth range selected for a particular survey, however, will be dependent on a number of factors, primarily on the depths at which deposits may be expected and the depths to which drilling may be extended. Likewise, the depth resolution of the survey may be adjusted as desired. Typically, the data will be analyzed at intervals of from about 5 to about 20 feet. Higher resolutions increase the likelihood of detecting valuable deposits. They require, however, correspondingly greater computation time and expense. It will be appreciated, therefore, that the range and resolution of the survey is a matter of preference as dictated by a number of geological, practical, and economic considerations well known to workers in the art.

The frequency that corresponds to each of the depths to be analyzed is derived from a frequency-depth function. The frequency to depth relationship for magnetotelluric signals is dependent on the Earth's resistivity and electrical properties for a particular area. Thus, the depth corresponding to a particular frequency will vary from location to location. Preferably, therefore, the frequency-depth function will be based on empirically determined resistivities in the survey area, such as may be derived from test or existing wells.

Figure 2:
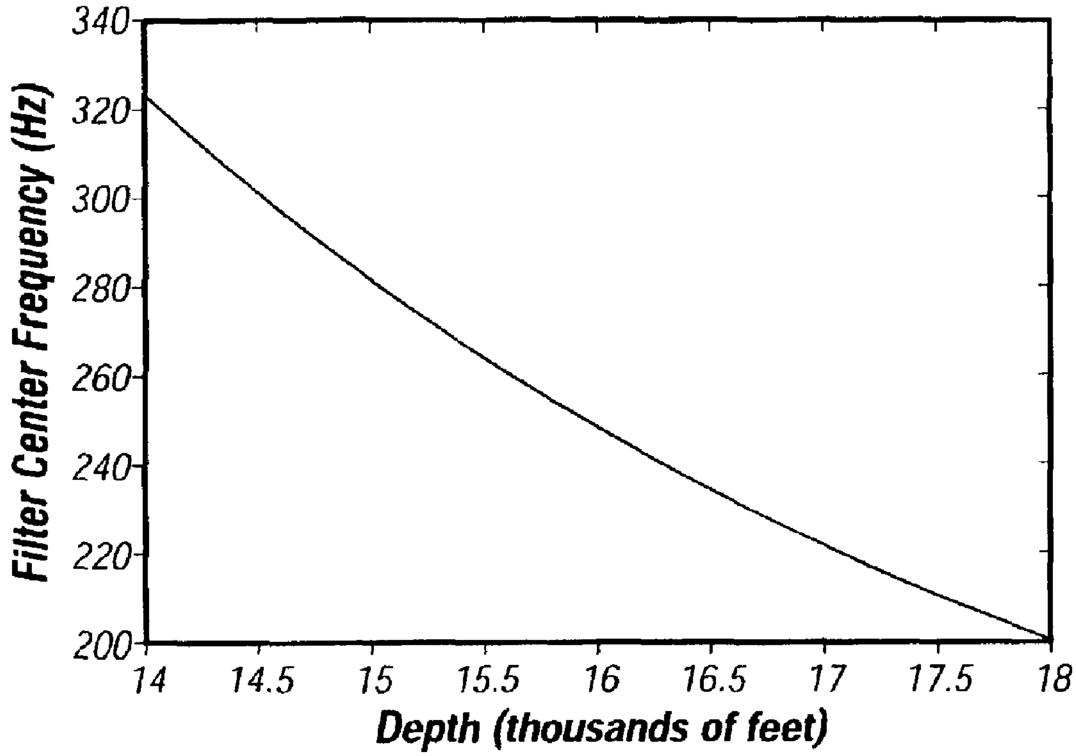
FIG. 2 is plot of a frequency-depth function showing the frequencies of magnetotelluric signals that correspond to particular subsurface depths.

The variation from area to area, however, usually is not so great that for many purposes an approximate or a more or less typical frequency-depth function may be used. For example, the frequency-depth function shown in FIG. 2 is a polynomial function derived from empirical data at various locations that have been reported in the literature. That function is more or less representative of the "typical" relationship between frequency and depth. An approximate frequency-depth function also may be derived from conventional skin effect conductivity analyses. Such approximate functions also may be adjusted to more closely resemble the actual frequency-depth function for a survey area by identifying formations and then comparing the surveyed depth of the formation to what is known about the depth of the formation through wells or seismic data.

While hard-wired frequency filters are known and may be suitable, the filters used in the novel processes preferably are a series of processing steps, typically including one or more mathematical functions, that may be encoded into digital computers for processing of the data. There are a number of well known rational polynomial functions that may be used alone or in combination with other functions to separate the data for a particular frequency from the data set as a whole, and in general those functions and processes may be used as frequency filters in the novel methods. Preferably, a linear phase filter is used. Such filters generate no phase distortion, i.e., they have constant time delay versus frequency. Finite impulse response (FIR) filters inherently preserve the phase of the signal and, therefore, may be used to advantage in the novel methods. FIR filters, however, are extremely complex, and so they require a relatively large amount of computational resources.

Excellent results, however, have been obtained by using a forward and a reverse infinite impulse response (IIR) filter at each frequency of interest. By using forward and reverse IIR filters the signal's phase is undistorted. IIR filters also are far less complex than FIR filters and data may be processed through them more quickly. The order and bandwidth of such filters may be defined in accordance with well known principles. For example, higher order filters have less skirt and provide more effective filtering for a given bandwidth, but are more complex and require more computational resources.

All of the frequency filters may have the same bandwidth. Preferably, however, the bandwidth of the filters will approximate a desired variance from their corresponding depth. That is, the center frequency for a filter will correspond to a particular depth of interest, and the bandwidth will be selected to pass frequencies corresponding to a more or less constant variance from that target depth. Since the frequency-depth function is not linear, that means the bandwidth will vary for each center frequency. At higher center frequencies (shallower depths), a slight change in depth corresponds to a relatively large change in frequency. The bandwidth for higher frequencies, therefore, will be relatively large. Likewise, at lower frequencies (deeper depths), where the change in frequency as a function of depth is relatively small, the bandwidth will be smaller.

For example, the bandwidth for a given center frequency may be based on the frequency difference between it and adjacent center frequencies, that is:

$$\text{Bandwidth}=|x(f_d)-x(f_{d\pm\Delta d})|$$

where x=the frequency to depth conversion polynomial $f_d$=frequency corresponding to depth d $f_{d\pm\Delta d}$=frequency corresponding to depth d±the depth resolution Δd.

The amplitude data preferably is rectified at an appropriate point in the novel methods. For example, as shown in step 5 in FIG. 1, the filtered data is rectified. Since the novel methods preferably identify and analyze amplitude peaks, rectification essentially doubles the amount of information being processed.

It is believed that amplitude peaks and their respective amplitudes in a magnetotelluric signal at a given frequency are indicative of the resistivity of the earth at the depth corresponding to that frequency. Thus, and in accordance with highly preferred aspects of the subject invention, amplitude peaks in the filtered data are identified and analyzed to determine a value correlated to the resistance of the earth at depths corresponding to each of the filter frequencies at each location. Values closely correlated to resistance have been derived based on the number of peaks, their amplitudes, and the combination thereof, where a peak is defined as a occurring at time t when the slope of the voltage-time plot (dv/dt) changes from positive to negative.

It will be appreciated, however, that the resistance values determined in accordance with the novel methods do not measure actual resistivity. Instead, the methods of the subject invention more accurately measure the relative resistivity of the earth at various depths of interest. The relative resistance values are indicative of the presence or absence of deposits such as hydrocarbons, metallic ores, water, and the like, and because the novel methods more accurately measure relative resistivities, those deposits may be identified with greater certainty and accuracy. Of course, if so desired, the relative resistivities determined in accordance with the subject invention may be scaled to more accurately reflect actual resistivities.

For example, as shown in step 6 of FIG. 1, peaks in the filtered data are identified. The peaks and their respective amplitudes are the data of interest, and in step 7 of FIG. 1, the peaks are analyzed to determine relative resistance values corresponding to the depths of interest.

The peak analysis may incorporate a variety of conventional statistical analyses. Many of the peaks may reflect excessive amounts of noise, or otherwise may represent an aberration, and so preferably the analysis will include operations designed to eliminate such peaks from the data set. For example, it has been observed that values more closely correlated to resistivity may be obtained by eliminating relatively high amplitude peaks. Thus, an upper amplitude threshold and, if desired, a lower amplitude threshold may be set, and only those peaks within the thresholds will be subjected to further analysis.

Preferably the thresholds are based on a statistical measure of the amplitude peak data such as the median, mean, or maximum amplitude of the peaks. Excellent results have been obtained by defining the thresholds by reference to the median or mean peak amplitude. For example, upper and lower thresholds may be set equal to the mean peak amplitude plus and minus a deviation factor. The deviation factor may be arbitrary or it may be based on the peaks' standard deviation or some other factor. Generally, it is expected that an upper threshold will be set within a factor of about 1.5 to 5.0 times the mean or median peak amplitude. Alternately, it is expected that the thresholds will be set from 1 to 3 standard deviation units of the mean or median peak amplitude. Various bins then may be defined within the threshold limits, and the peaks within the bins analyzed to determine resistance values.

The peak data, and preferably, a subset or subsets of those peaks with defined thresholds and/or bins, is subjected to statistical analysis to determine values correlated to resistivity. For example, it is believed that values closely correlated to resistivity have been derived based on the number of peaks, their amplitudes, and the combination thereof. For example, the peak count, peak density, peak amplitude sum, and the product of the peak count or peak density and the peak amplitude sum have been found to correlate to resistivity. The peak count and peak density have been observed to be the most accurate and reliable. Other statistical measures may be tested with routine effort, however, and may be found to correlate to resistivity as well.

Since the statistical measurement that provides the best correlation to actual values, or that may provide a display that may be interpreted easily may vary from data set to data set or by survey area, preferably the data is analyzed in various ways to optimize the statistical analysis. For example, variation of the thresholds and the bins, and analysis of various bins, will generally be desired to ascertain the bin that, when analyzed, yields values most closely correlated to resistance and most improves the contrast and signal to noise ratio. Regardless, it will be appreciated that by utilizing appropriate thresholds and bins the quality of the signal may be improved significantly.

It also will be appreciated, of course, that the exact design of the foregoing statistical analyses may be varied greatly within the scope of the subject invention. The selection of appropriate factors and parameters for such analyses is well within the skill of workers in the art and will depend on the quantity and quality of the data set that is being processed. While an analysis of the peak data is preferred because it has been shown to yield values closely correlated to resistivity, the filtered data may be subject to other types of analysis to the extent such analysis yields values that also may be correlated to resistance.

Preferably, for example as shown in step 8 of FIG. 1, a gain factor is applied to the resistance values for each location to scale the values for variation in amplitude attributable to depth, such variation largely consisting of attenuation of lower frequency signals. That aids in interpreting displayed data as it effectively scales the display to account for such differences.

Any number of gain factors may be designed and applied for such purposes. Excellent results have been observed by applying gain factors to the resistivity values that are normalized and inversely proportional to the bandwidth of the filter at the frequency corresponding to the depths of interest. Thus, greater depths where narrow bandwidth filters were applied will have larger gain factors, and vice versa for shallower depths where larger bandwidth filters were applied.

As shown in step 9 of FIG. 1, the data preferably is displayed for visual analysis. Most commonly, the resistance values will be displayed as a depth-location plot.

The methods of the subject invention preferably are implemented by computers and other conventional data processing equipment. Suitable software for doing so may be written in accordance with the disclosure herein. Such software also may be designed to process the data by additional methods outside the scope of, but complimentary to the novel methods. Accordingly, it will be appreciated that suitable software will include a multitude of discrete commands and operations that may combine or overlap with the steps as described herein. Thus, the precise structure or logic of the software may be varied considerably while still executing the novel processes.

EXAMPLES

The invention and its advantages may be further understood by reference to the following example. It will be appreciated, however, that the invention is not limited thereto.

Example 1

A magnetotelluric survey was conducted in a known oil and gas producing field in southern Louisiana, United States of America. The data was recorded and digitally stored with using a high gain audio amplifier and a laptop computer utilizing a DSP acquisition system, all of which are commercially available and typical of the equipment that may be used in gathering and processing magnetotelluric data. Data was collected at approximately 32 locations over an area of approximately a quarter of a mile. The data was sampled at a rate of 32,786 Hz. The sampling period was 29 seconds. The range of depth investigated was from 14,000 to 18,000 feet at a resolution of 40 feet.

Figure 6:
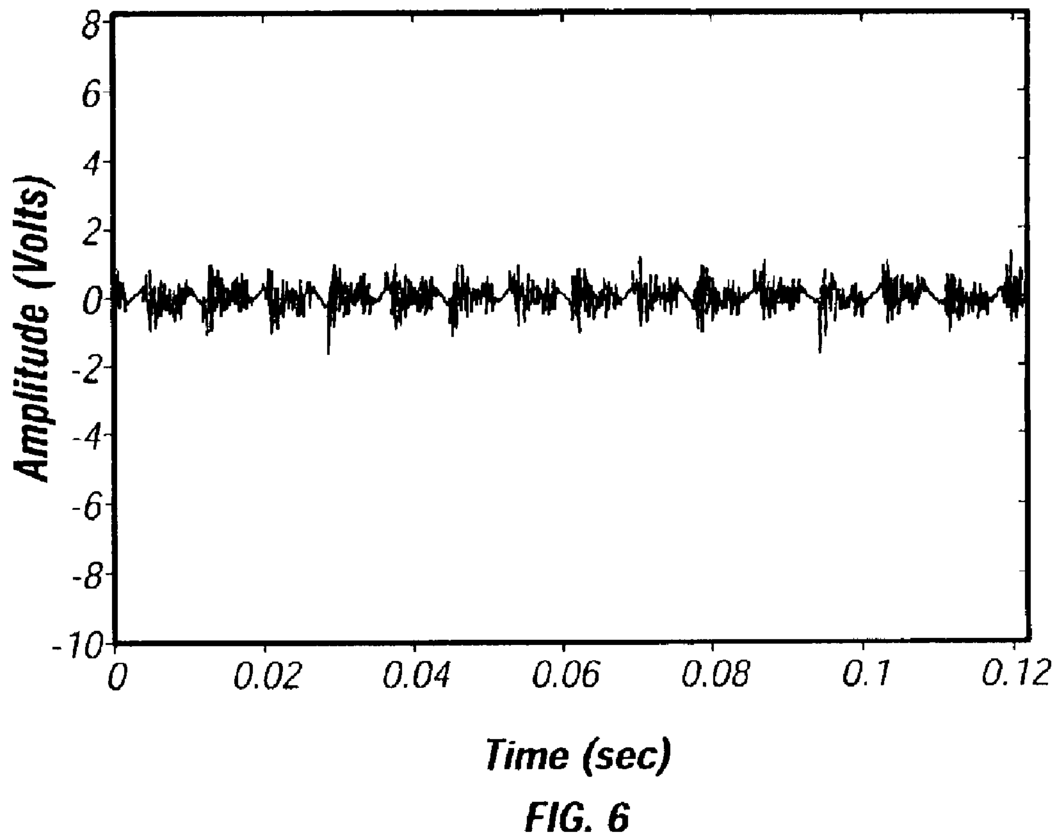
FIG. 6 is a printout of unprocessed amplitude data recorded in a magnetotelluric survey taken in a known oil and gas producing field in southern Louisiana, United States, which data was processed in accordance with preferred methods of the subject invention as described in Example 1.
Figure 7:
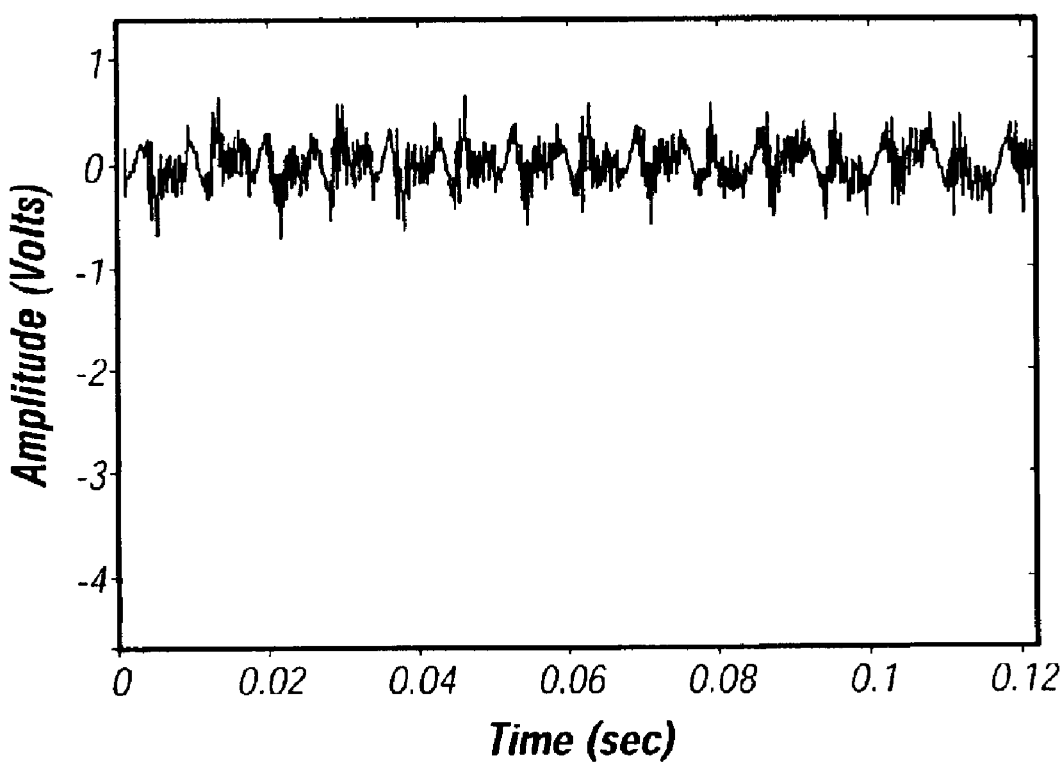
FIG. 7 is a printout of the data shown in FIG. 6 after decimation in accordance with a preferred aspect of the novel methods.

The raw amplitude data collected at the first survey location over the first 120 msec of the 29 second sampling period is shown in FIG. 6. The amplitude data then was decimated by a factor of 4. A printout of the data shown in FIG. 6, after decimation, is shown in FIG. 7.

Figure 5:
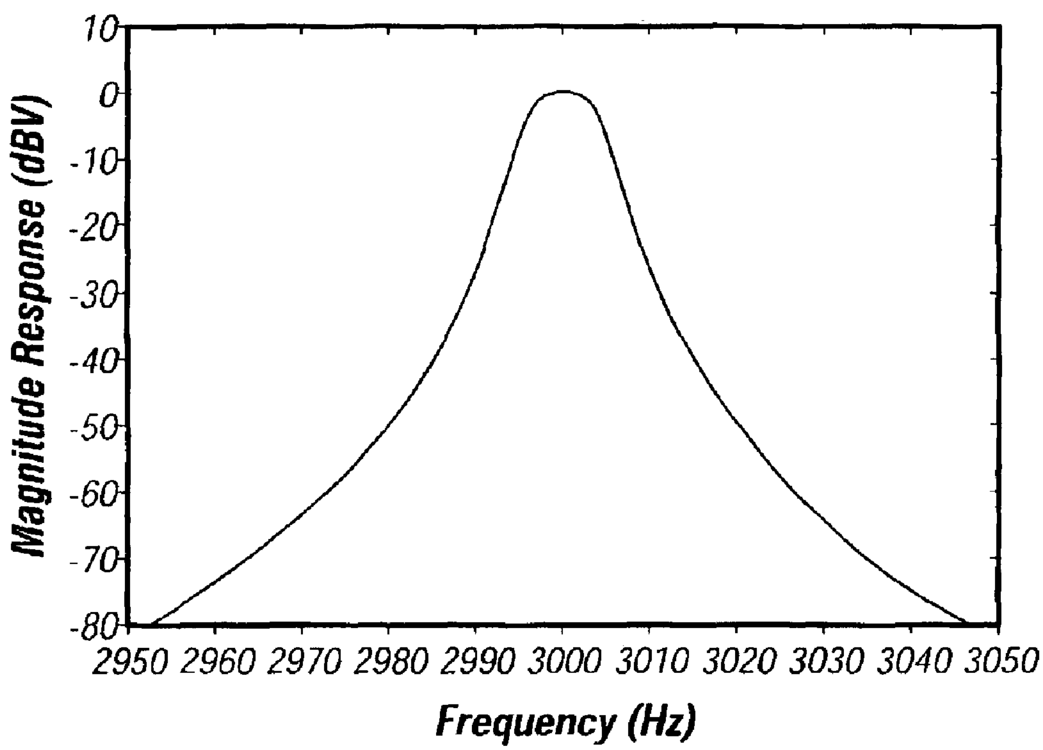
FIG. 5 shows the magnitude response of a frequency filter process, the center frequency of which (approximately 3000 Hz) corresponds to zero depth and which may be used in power normalizing magnetotelluric data in accordance with preferred aspects of the novel methods.

The decimated data then was normalized by applying a normalizing factor to the amplitude data for each location. The normalization factor was based on the signal at 3000 Hz, the frequency corresponding to zero depth. Thus, the signal for each location was passed through a filter designed to pass that portion of the signal at 3000 Hz. The filter had a bandwidth of less than 8 Hz and is described by the following second order linear infinite impulse response filtering equation:

$$y_n=b_1x_n+b_2x_{n-1}+\ldots+b_{nb+1}x_{n-nb}-a_2y_{n-1}-\ldots-a_{na+1}y_{n-na}$$

where $y_n$=filter output data sequence b=filter numerator polynomial x=filter input data sequence a=filter denominator polynomial n=data index After the data was filtered in the forward direction, the data sequence was reversed and the data run back through the same filter equation. The final output of the filtering process is the time reverse of the output of the second filtering operation. The filtered data had precisely zero phase distortion, and its amplitude was modified by the square of the filter's magnitude response. The magnitude response of the two-step filter process is shown in FIG. 5.

Figure 8:
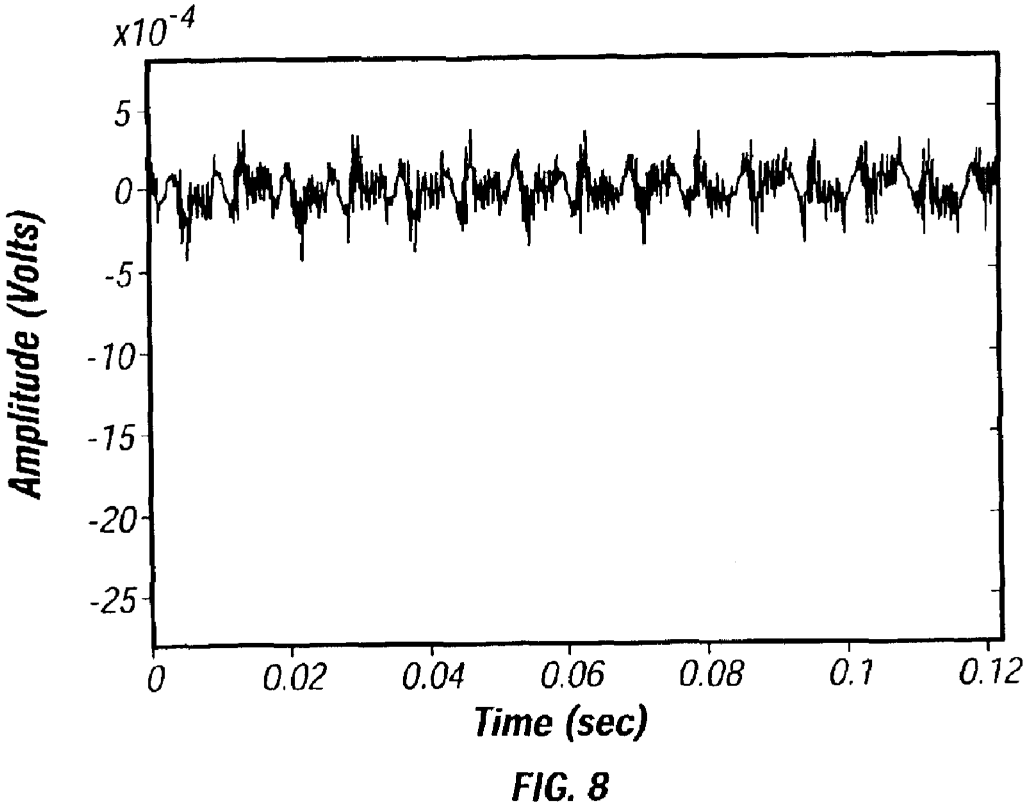
FIG. 8 is a printout of the data of FIG. 7 after power normalization in accordance with a preferred aspect of the novel methods.

The data, after having been filtered at 3000 Hz as described above, was analyzed to determine a normalization factor to be applied to the data. Specifically, the total power of the filtered magnetotelluric signal at each location was determined and divided into the decimated data for that location. A printout of the decimated data of FIG. 7 that has been power normalized is shown in FIG. 8.

Figure 3:
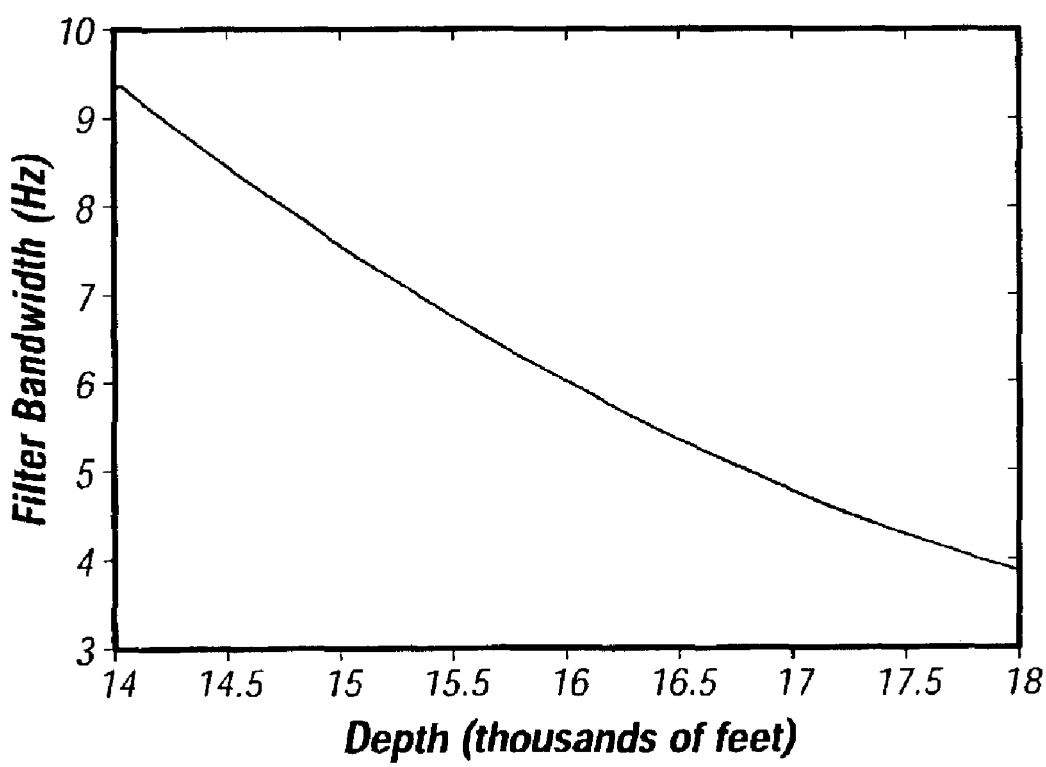
FIG. 3 is a plot of the bandwidth of frequency filters useful in the novel methods as a function of subsurface depth, the subsurface depths corresponding to the center frequency of the filters.

The normalized data then was filtered by a set of frequency filters that corresponded to the depth range of interest (14,000 to 18,000 feet) at the desired resolution (40 feet). The center frequency of each filter was determined from the frequency-depth function shown in FIG. 2. The corresponding bandwidth of each filter was based on the frequency difference between it and adjacent center frequencies. Those bandwidths are shown in FIG. 3.

The frequency filters were second order linear infinite impulse response filters similar to the frequency filter described above that was used in power normalizing the data. Similar to what was done in filtering the data for power normalization, the data was filtered in the forward direction, the data sequence reversed, filtered again, and reversed again to restore it to its original order. After filtering, the data were rectified, and peaks in the data were identified and sorted for further analysis.

Figure 9:
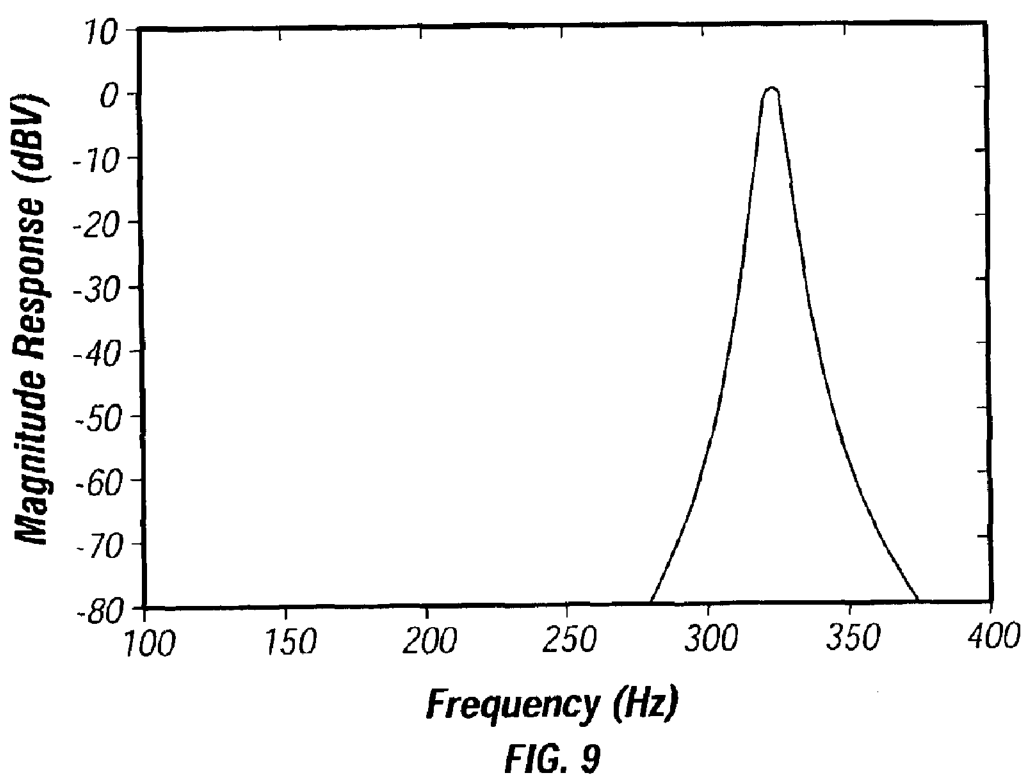
FIG. 9 shows the magnitude response of a filter process corresponding to a depth of 14,000 feet (approximately 325 Hz) that was used in Example 1 to filter the data of FIG. 8 and other survey data.
Figure 10:
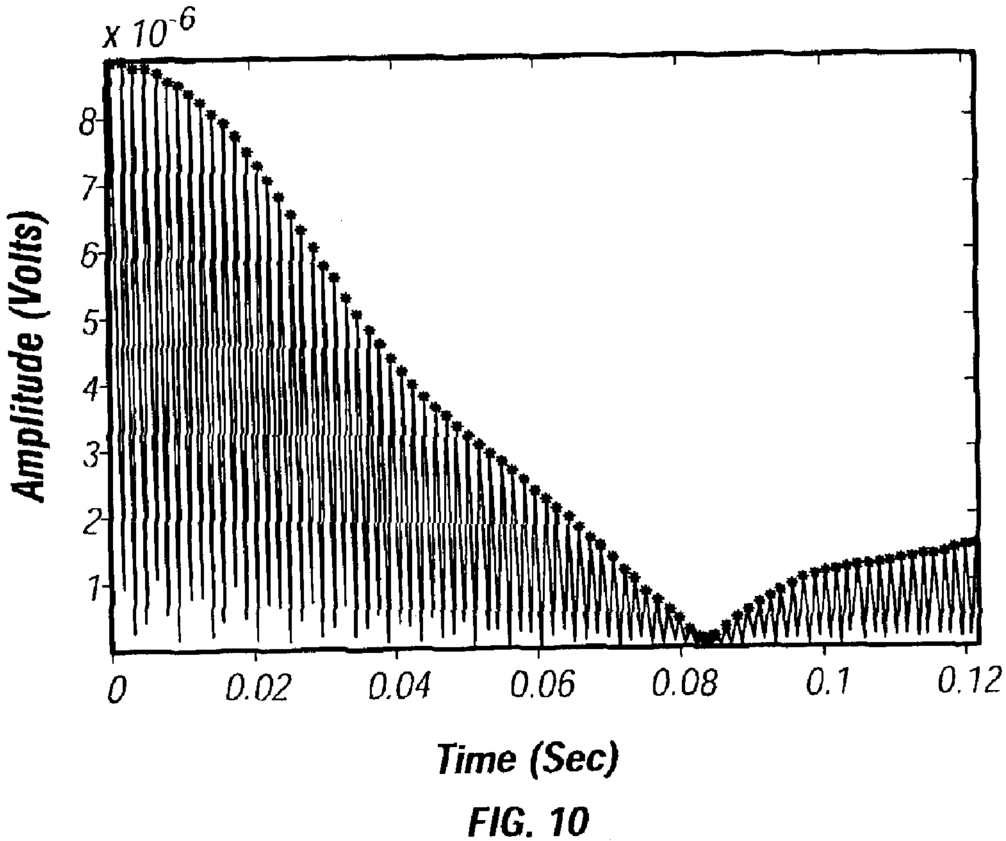
FIG. 10 shows the peaks identified in the data of FIG. 8 after the data were run through the filter of FIG. 9.
Figure 11:
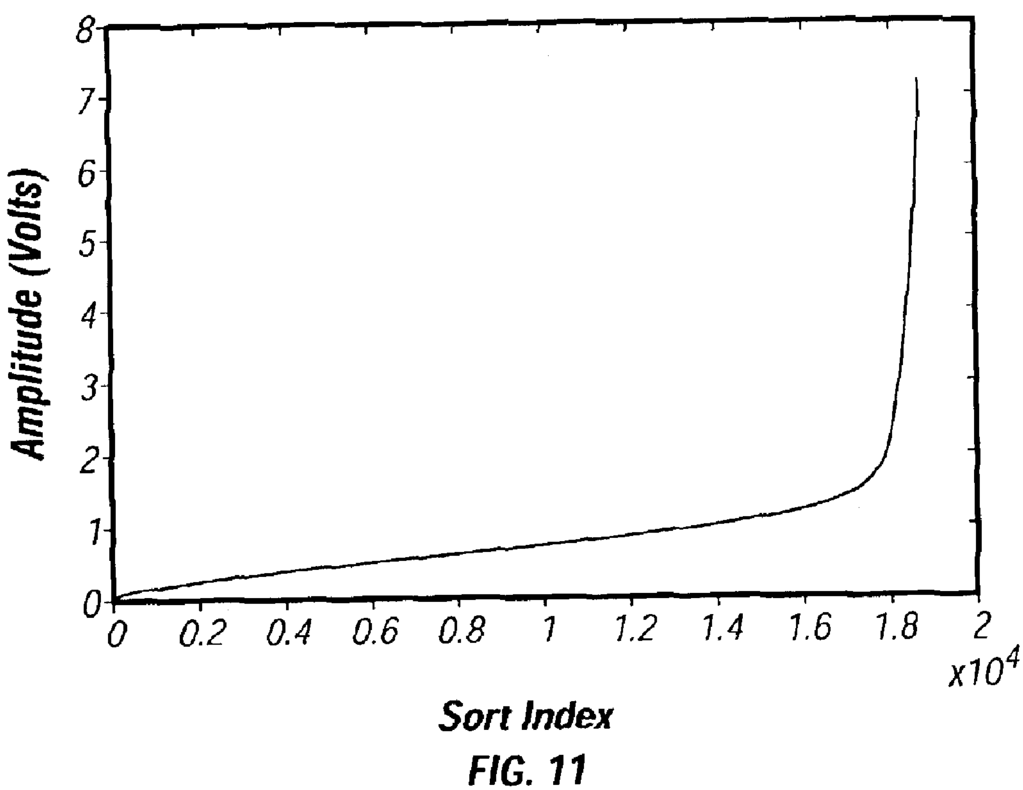
FIG. 11 is a plot of the peaks identified in FIG. 10 after sorting.

For example, the frequency filter process corresponding to a depth of 14,000 feet (approximately 325 Hz) is shown in FIG. 9. FIG. 10 shows the peaks identified in the data of FIG. 8 after the data were run through the filter of FIG. 9. FIG. 11 is a plot of the peaks after sorting.

Figure 12:
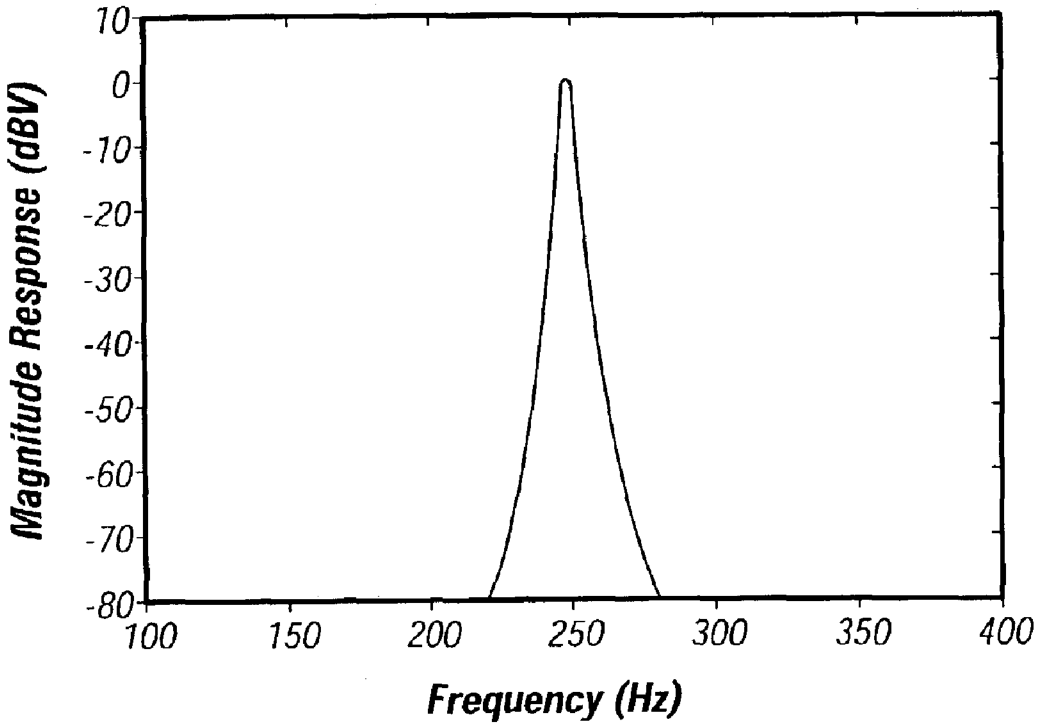
FIG. 12 shows the magnitude response of a filter process corresponding to a depth of 16,000 feet (approximately 250 Hz) that was used in Example 1 to filter the data of FIG. 8 and other survey data.
Figure 13:
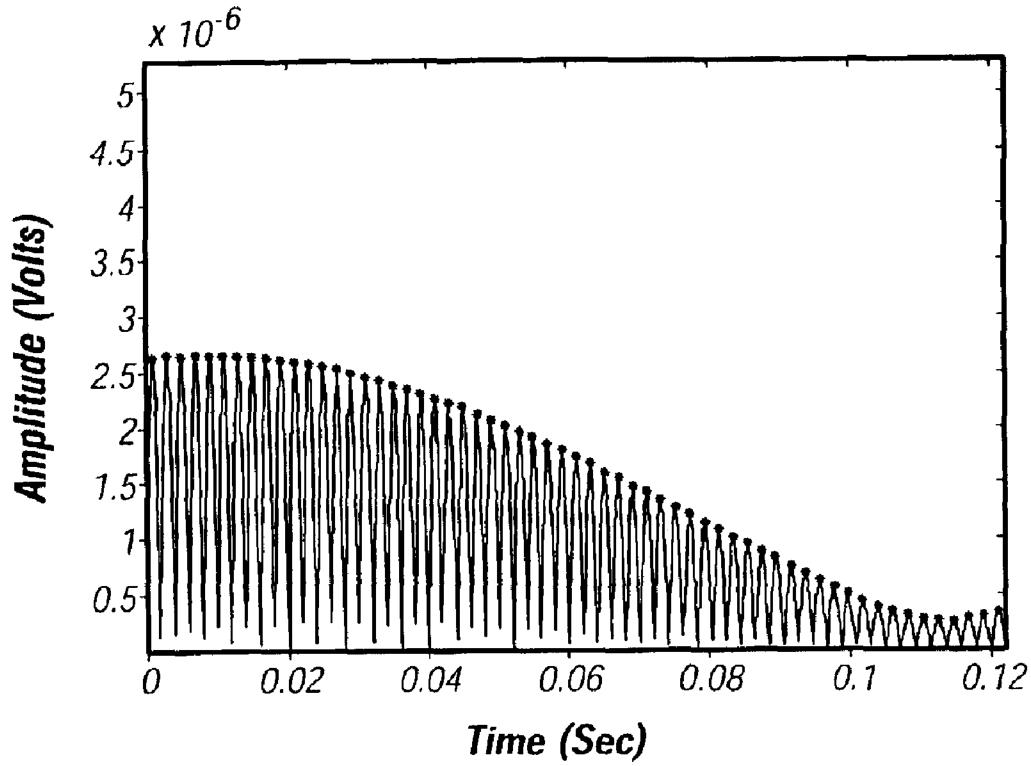
FIG. 13 shows the peaks identified in the data of FIG. 8 after the data were run through the filter of FIG. 12.
Figure 14:
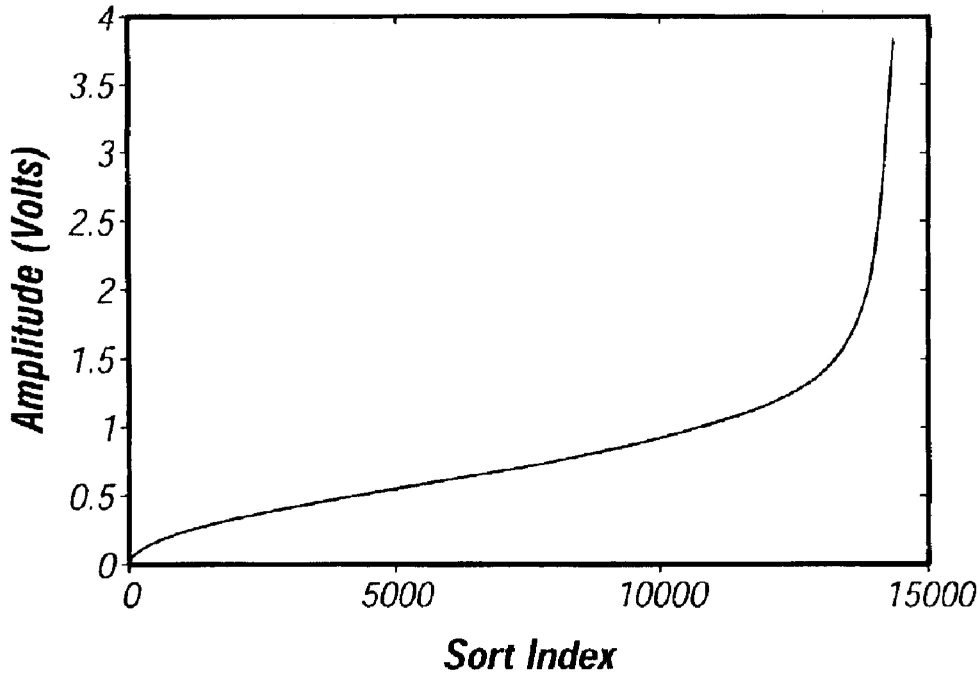
FIG. 14 is a plot of the peaks identified in FIG. 13 after sorting.

As a further example, the frequency filter process corresponding to a depth of 16,000 feet (approximately 250 Hz) is shown in FIG. 12. FIG. 13 shows the peaks identified in the data of FIG. 8 after the data were run through the filter of FIG. 12. FIG. 14 is a plot of the peaks after sorting.

Figure 15:
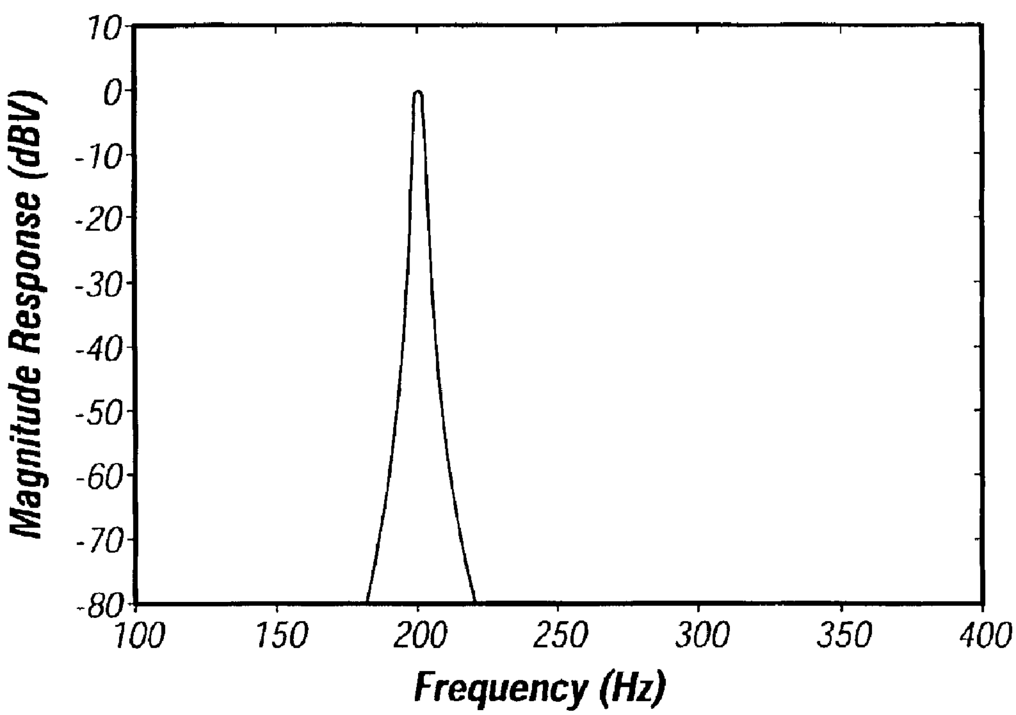
FIG. 15 shows the magnitude response of a filter process corresponding to a depth of 18,000 feet (approximately 200 Hz) that was used in Example 1 to filter the data of FIG. 8 and other survey data.
Figure 16:
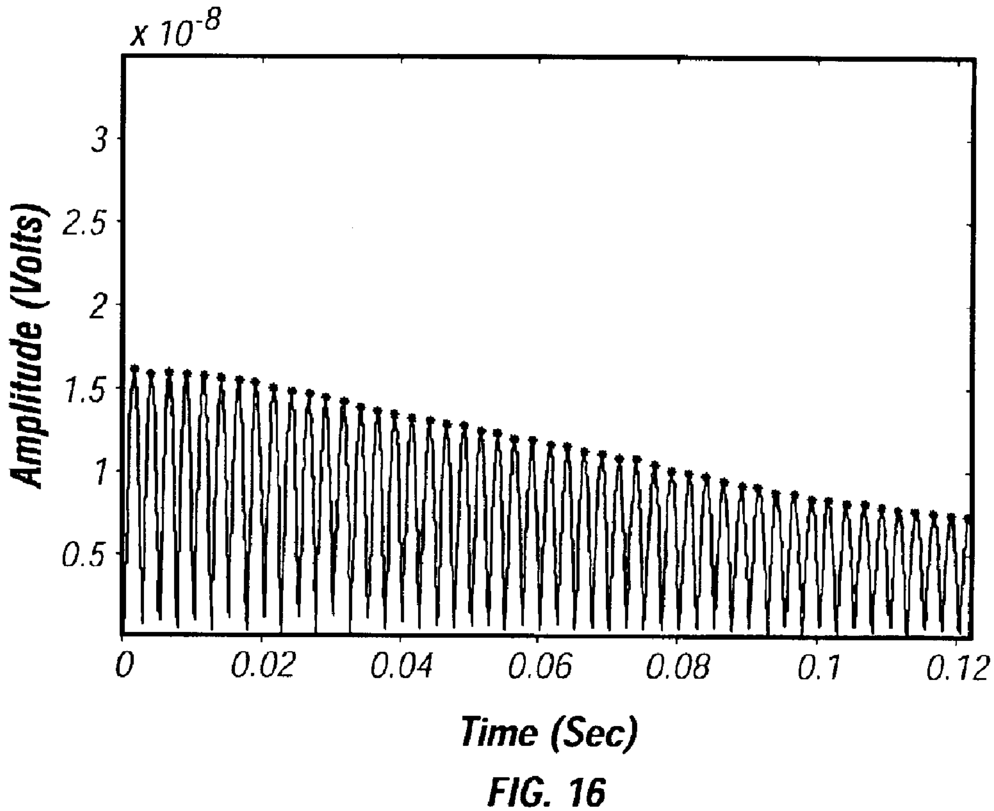
FIG. 16 shows the peaks identified in the data of FIG. 8 after the data were run through the filter of FIG. 15.
Figure 17:
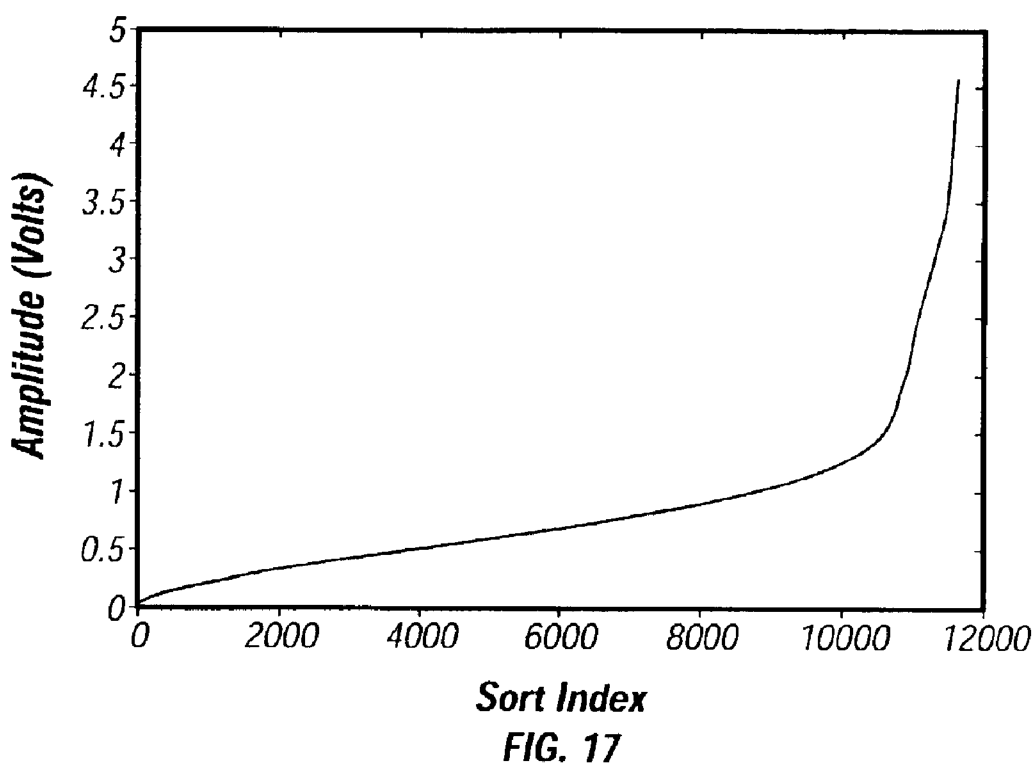
FIG. 17 is a plot of the peaks identified in FIG. 16 after sorting.
Figure 18:
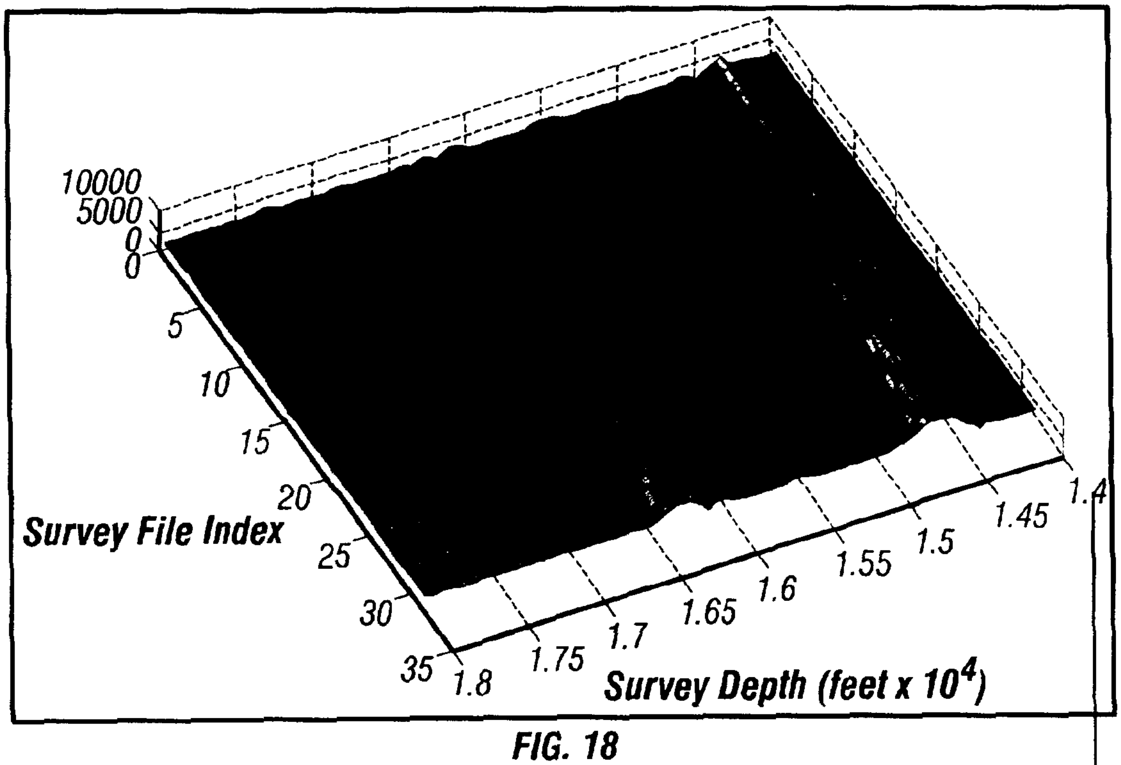
FIGS. 18–26 are plots of relative resistivity values at various depths and locations across the survey area as determined by the methods of Example 1, which depth-location plots illustrate the selection and use of different threshold values and methods for statistically analyzing the amplitude peaks identified in the magnetotelluric data to derive values correlating to resistivity.
Figure 19:
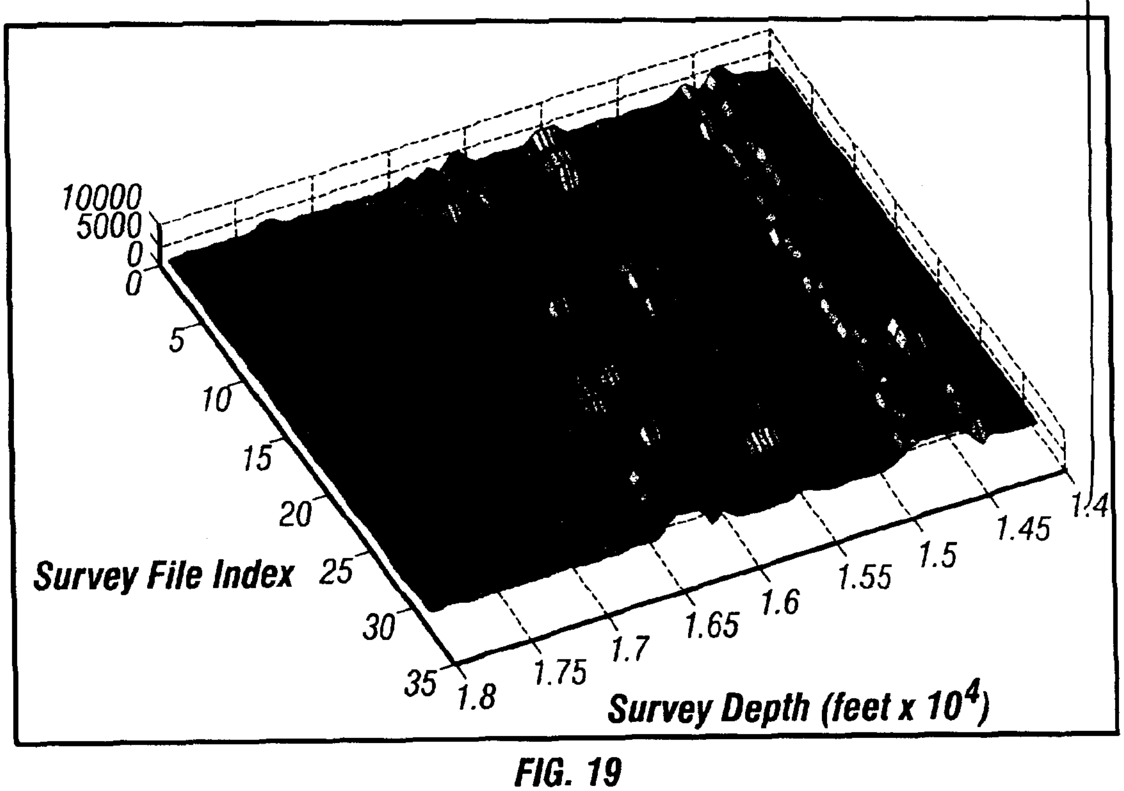
Figure 20:
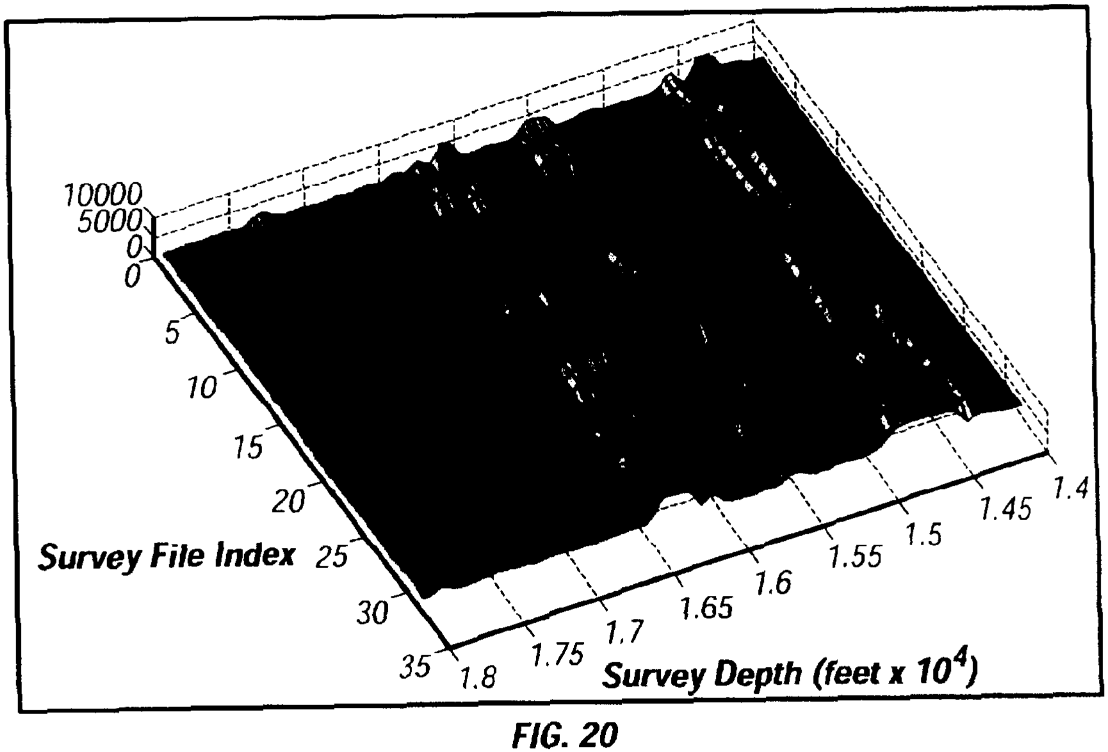
Figure 21:
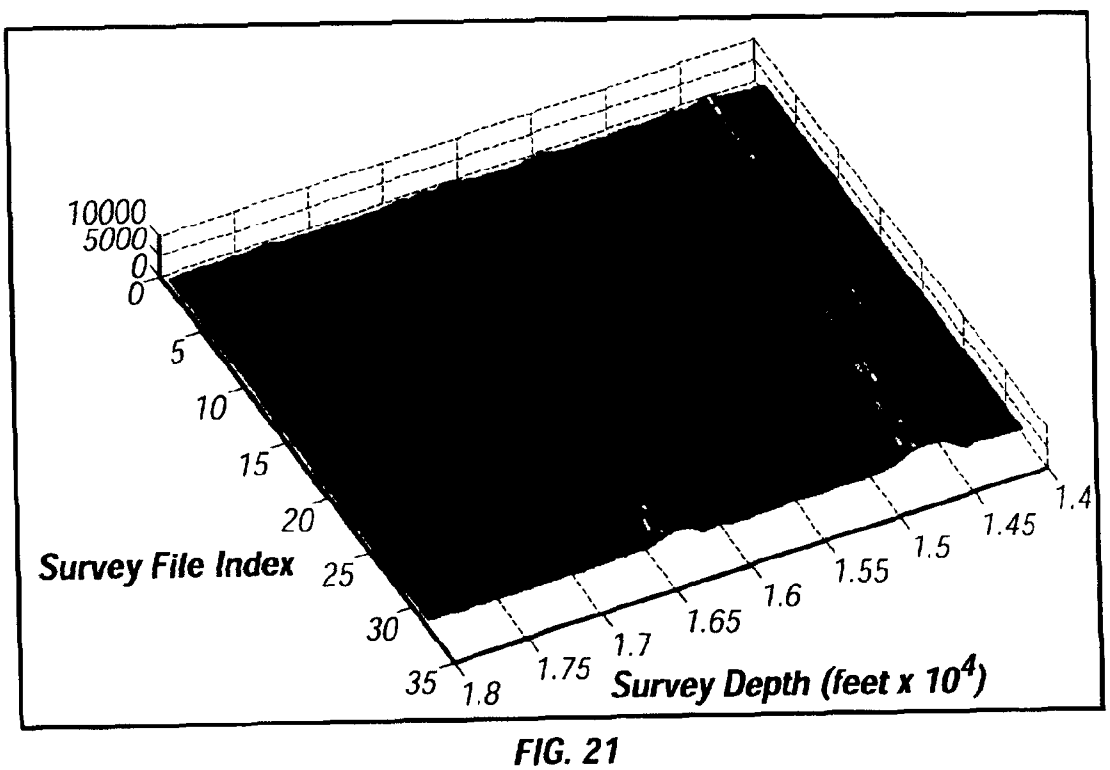
Figure 22:
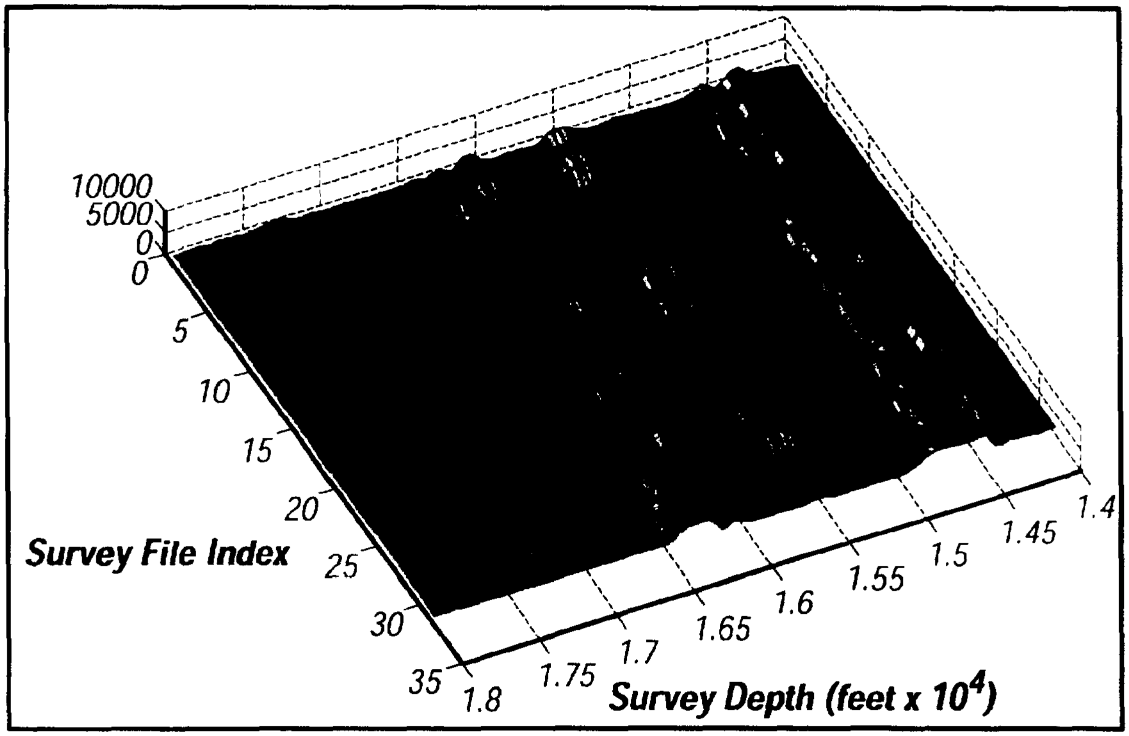
Figure 23:
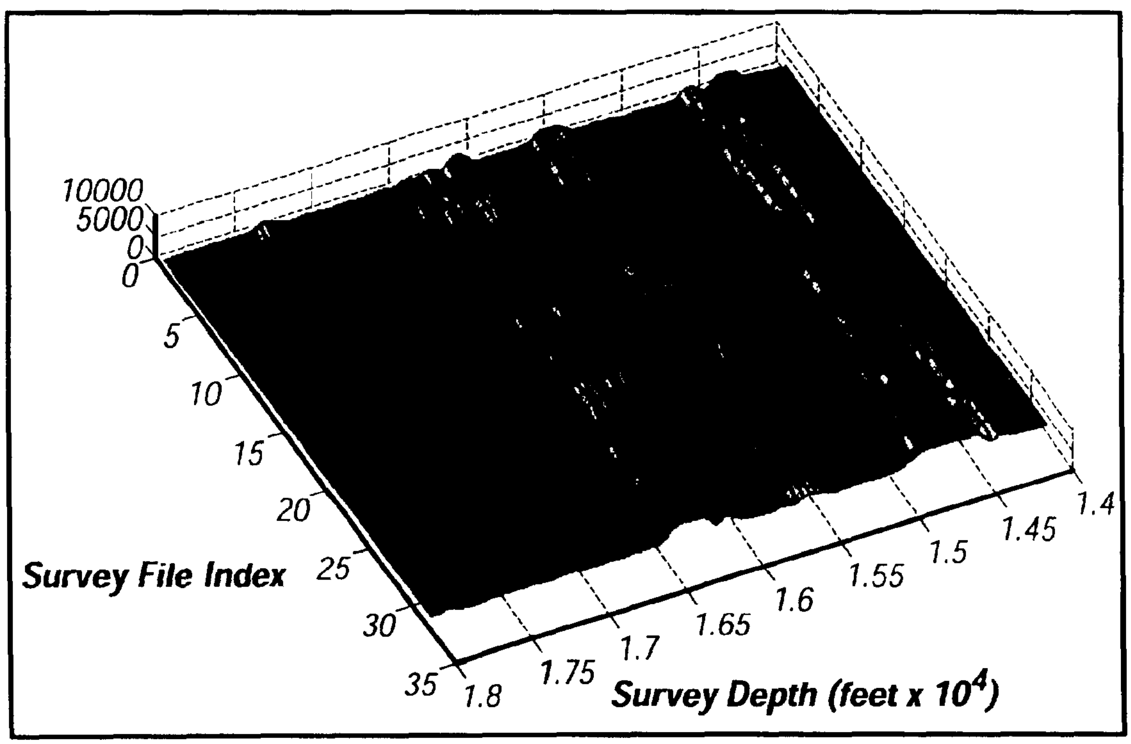
Figure 24:
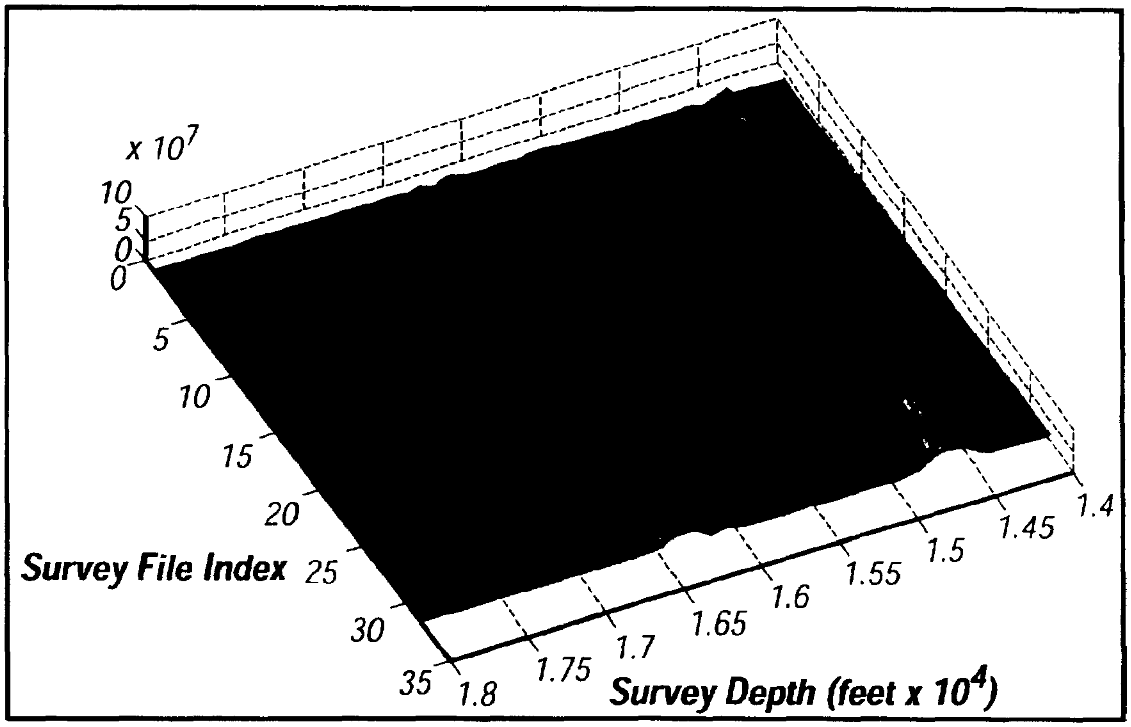
Figure 25:
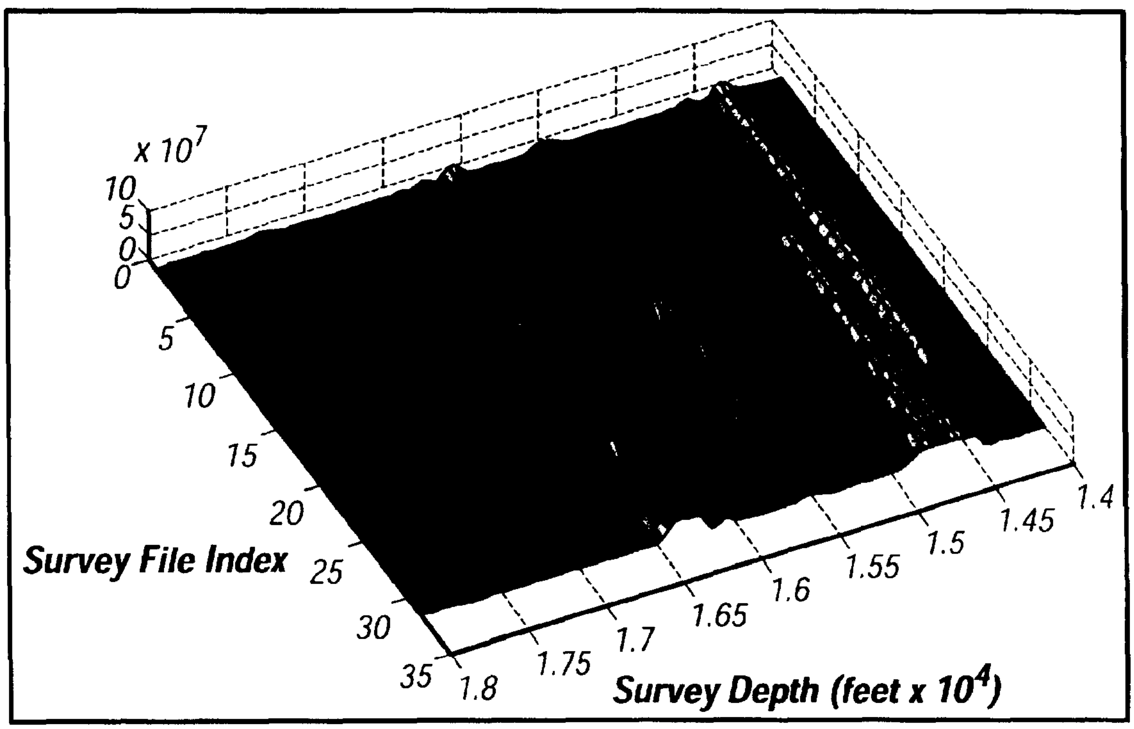
Figure 26:
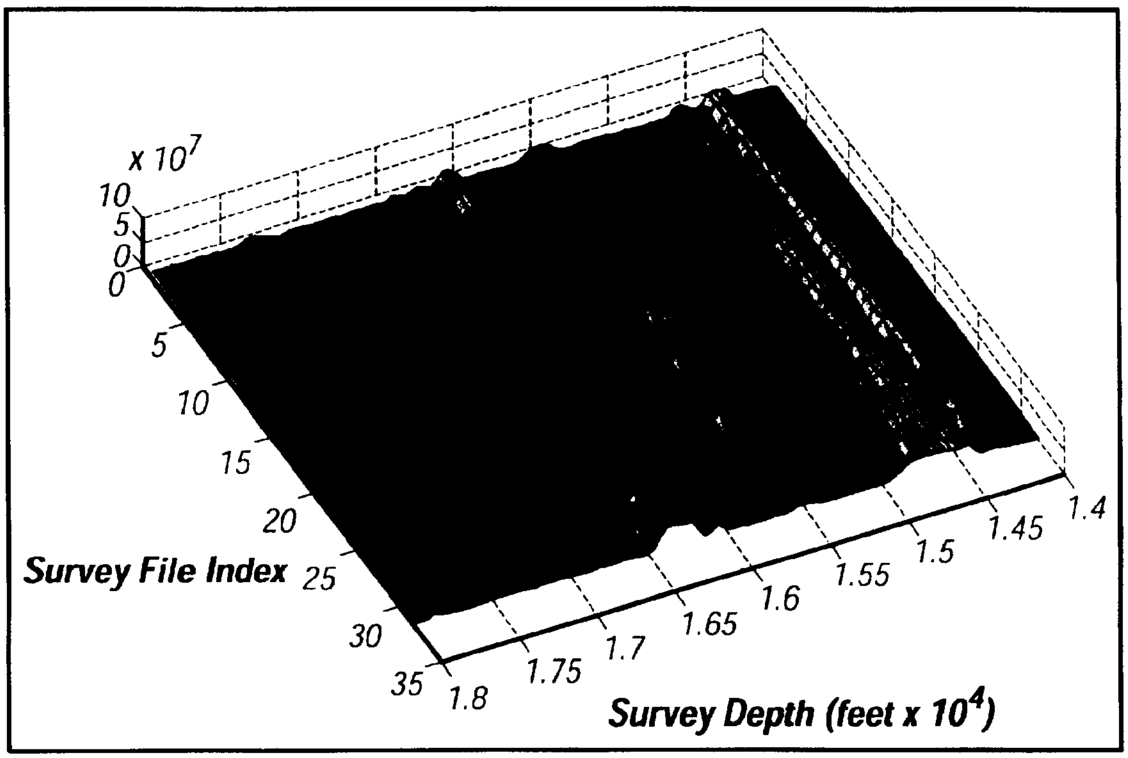

Similarly, FIGS. 15, 16, and 17 show the filter process, identified peaks, and sorted peaks at the frequency corresponding to 18,000 feet (approximately 200 Hz).

Figure 4:
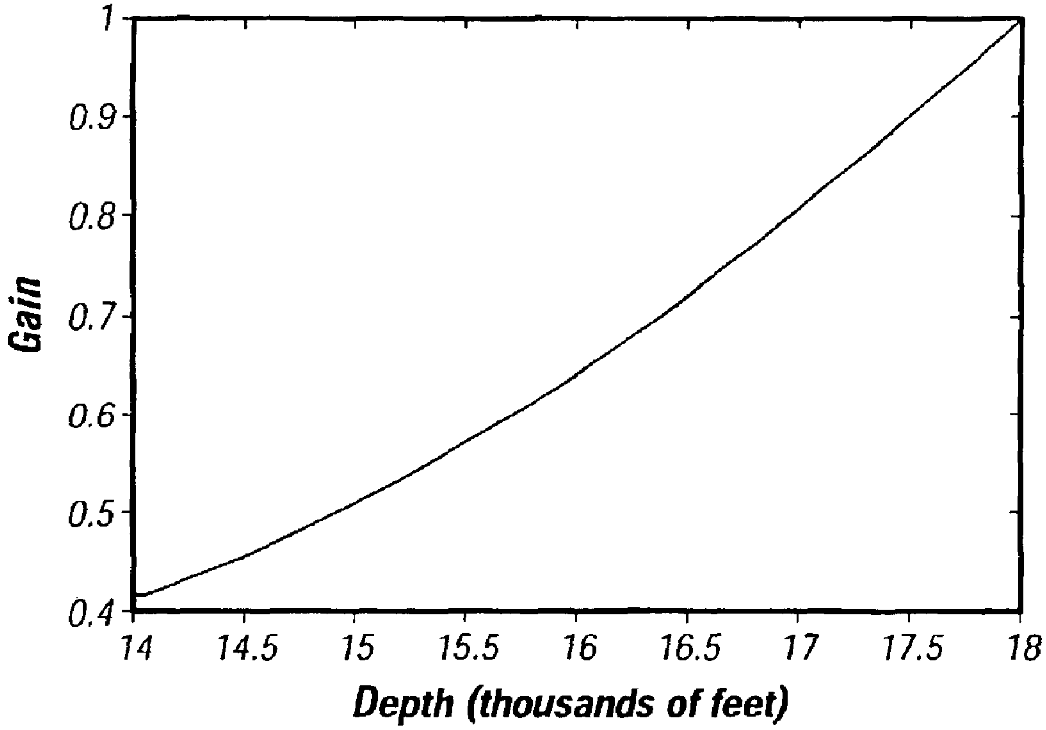
FIG. 4 is a plot of depth dependent gain factors that may be applied to resistivity values in accordance with preferred aspects of the novel methods.

The peaks at each frequency at each location then were statistically analyzed to determine a value correlated to the resistance of the earth at that depth and location. Specifically, each set of peaks were subjected to an upper threshold ($T_{max}$) of 1.5 times the median peak amplitude and a lower threshold of zero. The upper threshold was then used to define various upper and lower bin limits. Various statistical analyses, namely peak count within the threshold values, sum of the amplitude of thresholded peaks, and the sum of the amplitudes multiplied by the peak count within the threshold values, were performed on the peaks within various bins. The resulting values were gain adjusted by applying a frequency dependent gain factor, which gain factors are shown in FIG. 4. The gain adjusted values were then plotted across survey location and depth to generate the plots shown in FIGS. 18 to 26. The bin limits and statistical analysis used to generate each of those depth-location plots is shown in Table 1 below:

TABLE 1

| Figure | Lower Bin Limit (x $T_{max}$) | Upper Bin Limit (x $T_{max}$) | Analysis |
|---|---|---|---|
| 18 | 0.3 | 0.7 | peak count |
| 19 | 0.4 | 0.8 | peak count |
| 20 | 0.5 | 0.9 | peak count |
| 21 | 0.3 | 0.7 | sum of peak amplitudes |
| 22 | 0.4 | 0.8 | sum of peak amplitudes |
| 23 | 0.5 | 0.9 | sum of peak amplitudes |
| 24 | 0.3 | 0.7 | peak count times sum of peak amplitudes |
| 25 | 0.4 | 0.8 | peak count times sum of peak amplitudes |
| 26 | 0.5 | 0.9 | peak count times sum of peak amplitudes |

It will be appreciated that all of the survey depth-location plots display prominent areas of increased resistivity. For example, it will be noted that in each plot there is a ridge appearing at approximately 14,500 feet that indicates an area of increased resistance and, therefore, the likely presence of a hydrocarbon deposit. The depth-location plots of FIGS. 18–26 were compared to data collected through various wells that had been drilled in the area. It was found that the plots corresponded precisely to the empirically determined geology of the field and identified the presence of known hydrocarbon reservoirs.

It also will be appreciated that the different bins do not change the overall nature of the results, as may be seen by comparing those depth-location plots utilizing the same statistical analysis. Selection of appropriate threshold values and bins, however, can improve the contrast and signal to noise ratio of the data. Similarly, each of the statistical analyses applied to the data identified areas of increased resistivity, but the peak amplitude sums provided improved contrast.

The foregoing examples demonstrate the improved processing of magnetotelluric data by the novel methods and thus, that the novel methods ultimately allow for more accurate inferences about the depth and location of hydrocarbons, ores, water and other valuable natural resources having contrasting resistivities.

While this invention has been disclosed and discussed primarily in terms of specific embodiments thereof, it is not intended to be limited thereto. Other modifications and embodiments will be apparent to the worker in the art.

What is claimed is:

1. A method of processing magnetotelluric signals to identify subterranean deposits, said method comprising:

(a) obtaining magnetotelluric data from an area of interest, said magnetotelluric data comprising the amplitude of magnetotelluric signals recorded over time at one or more defined locations in said area of interest;

(b) filtering said magnetotelluric data for each said location at a set of predetermined frequencies to separate the amplitude data at said frequencies from the remainder of said amplitude data for said locations, wherein said frequencies correspond to subterranean depths over a range of interest;

(c) identifying the amplitude peaks in said filtered amplitude data; and (d) analyzing said amplitude peaks to determine a value correlated to the resistance of the earth at each said frequency at each said location; the resistance being indicative of the presence or absence of deposits at the corresponding subterranean depth.

2. The method of claim 1, wherein said amplitude data is power normalized across all locations in the survey.

3. The method of claim 2, wherein said amplitude data is power normalized by filtering said magnetotelluric data at a predetermined frequency, determining the total power of said filtered magnetotelluric data at each location, and applying a normalizing factor to the amplitude data for each location based on said total power of the signal at the location.

4. The method of claim 3, wherein said predetermined frequency corresponds to zero depth.

5. The method of claim 3, wherein said amplitude data for each location is divided by the total power of the signal at the location.

6. The method of claim 1, wherein said magnetotelluric data is filtered at said frequencies by a linear phase process.

7. The method of claim 1, wherein said magnetotelluric data is filtered at said frequencies by a forward and a reverse infinite impulse response filter process.

8. The method of claim 1, wherein said predetermined frequencies corresponding to subterranean depths are determined by a skin effect conductivity analysis.

9. The method of claim 1, wherein said predetermined frequencies corresponding to subterranean depths are determined from a polynomial frequency-depth function fitted to a set of empirical data correlating frequency to depth.

10. The method of claim 9, wherein said empirical data is for the area of interest.

11. The method of claim 1, wherein said amplitude data is rectified before said peak analysis.

12. The method of claim 1, wherein said amplitude peaks are analyzed by defining threshold amplitude values for said peaks, analyzing the peaks within said threshold amplitude values, and determining said resistance values from the analysis of peaks within said threshold amplitude values.

13. The method of claim 1, wherein said amplitude peaks are analyzed by defining threshold amplitude values for said peaks, defining one or more bins within said threshold amplitude values, analyzing the peaks within each said bin, and determining said resistance values from said peak analysis for said bins.

14. The method of claim 12, wherein said threshold amplitude values are based on a statistical analysis of said amplitude peaks.

15. The method of claim 14, wherein said threshold amplitude values are based on the maximum peak amplitude, the mean peak amplitude, or the median peak amplitude of the filtered amplitude data.

16. The method of claim 14, utilizing an upper threshold amplitude value equal to from about 1.5 to about 5.0 times the mean peak amplitude or the median peak amplitude.

17. The method of claim 14, utilizing an upper threshold amplitude value equal to the mean peak amplitude or the median peak amplitude plus from about 1 to about 3 standard deviation units.

18. The method of claim 1, wherein said resistance value for a defined frequency at a defined location is based on the number of peaks of all or a subset of said amplitude peaks identified at said frequency and said location, the amplitudes of said peaks, or a combination thereof.

19. The method of claim 18, wherein said resistance value for a defined frequency at a defined location is the peak count or the peak density of all or a subset of said amplitude peaks identified at said frequency and said location.

20. The method of claim 18, wherein said resistance value for a defined frequency at a defined location is the average amplitude or amplitude sum of all or a subset of said amplitude peaks identified at said frequency and said location.

21. The method of claim 18, wherein said resistance value for a defined frequency at a defined location is the product of (a) the peak count or peak density and (b) the peak amplitude sum of all or a subset of said amplitude peaks identified at said frequency and said location.

22. The method of claim 1, wherein a gain factor is applied to said resistance values to scale said values for depth variation.

23. The method of claim 22, wherein said gain factor applied to said resistance values is inversely proportional to the bandwidth at which said magnetotelluric data was frequency filtered.

24. The method of claim 22, wherein said gain factor is the normalized inverse of the bandwidth at which said magnetotelluric data was frequency filtered.

25. The method of claim 1, further comprising displaying said resistance values as a depth-location plot.

26. A method of processing magnetotelluric signals to identify subterranean deposits, said method comprising:

(a) obtaining magnetotelluric data from an area of interest, said magnetotelluric data comprising the amplitude of magnetotelluric signals recorded over time at one or more defined locations in said area of interest;

(b) normalizing said amplitude data across all locations in the survey by filtering said magnetotelluric data at a predetermined frequency corresponding to zero depth, summing the total power of said filtered magnetotelluric data at each location, and applying a normalizing factor to the amplitude data for each location based on the total power corresponding to the location;

(c) filtering the magnetotelluric signals for each said location at a set of predetermined frequencies by a forward and a reverse infinite impulse response filter process to separate the amplitude data of said signal at said frequencies from the remainder of said amplitude data for said location;

(d) wherein said frequencies correspond to subterranean depths over a range of interest, said depths having been determined from a polynomial frequency-depth function fitted to a set of empirical data correlating frequency to depth;

(e) rectifying said filtered amplitude data;

(f) identifying the amplitude peaks in said filtered amplitude data;

(g) analyzing said amplitude peaks to determine a value correlated to the resistance of the earth at each said frequency at each said location, the resistance being indicative of the presence or absence of deposits at the corresponding subterranean depth;

(h) applying a gain factor to said resistance values to scale said resistance values for depth variation, said gain factor being the normalized inverse of the bandwidth at which said magnetotelluric data was frequency filtered; and (i) displaying said resistance values as a depth-location plot.

27. A method of processing magnetotelluric signals to identify subterranean deposits, said method comprising:

(a) obtaining magnetotelluric data from an area of interest, said magnetotelluric data comprising the amplitude of magnetotelluric signals sampled over a period of at least about 5 seconds at one or more defined locations in said area of interest;

(b) filtering said magnetotelluric data for each said location at a set of predetermined frequencies to separate the amplitude data at said frequencies from the remainder of said amplitude data for said locations, wherein said frequencies correspond to subterranean depths over a range of interest; and (c) analyzing said filtered data to determine a value correlated to the resistance of the earth at each said frequency at each said location; the resistance being indicative of the presence or absence of deposits at the corresponding subterranean depth.

28. The method of claim 27, wherein the magnetotelluric signals are sampled over a period of at least about 20 seconds.

29. The method of claim 27, wherein the magnetotelluric signals are sampled over a period of from about 5 seconds to about 60 seconds.

30. The method of claim 27, wherein the magnetotelluric signals are sampled over a period of from about 20 seconds to about 60 seconds.

31. The method of claim 1, wherein said magnetotelluric data comprises the amplitude of magnetotelluric signals recorded over time at more than one defined location in said area of interest.

32. The method of claim 31, wherein said amplitude peaks are analyzed by defining threshold amplitude values for said peaks, analyzing the peaks within said threshold amplitude values, and determining said resistance values from the analysis of peaks within said threshold amplitude values.

33. The method of claim 31, wherein said amplitude peaks are analyzed by defining threshold amplitude values for said peaks, defining one or more bins within said threshold amplitude values, analyzing the peaks within each said bin, and determining said resistance values from said peak analysis for said bins.

34. The method of claim 32, wherein said threshold amplitude values are based on a statistical analysis of said amplitude peaks.

35. The method of claim 34, wherein said threshold amplitude values are based on the maximum peak amplitude, the mean peak amplitude, or the median peak amplitude of the filtered amplitude data.

36. The method of claim 34, utilizing an upper threshold amplitude value equal to from about 1.5 to about 5.0 times the mean peak amplitude or the median peak amplitude.

37. The method of claim 34, utilizing an upper threshold amplitude value equal to the mean peak amplitude or the median peak amplitude plus from about 1 to about 3 standard deviation units.

38. The method of claim 31, wherein said resistance value for a defined frequency at a defined location is based on the number of peaks of all or a subset of said amplitude peaks identified at said frequency and said location, the amplitudes of said peaks, or a combination thereof.

39. The method of claim 38, wherein said resistance value for a defined frequency at a defined location is the peak count or the peak density of all or a subset of said amplitude peaks identified at said frequency and said location.

40. The method of claim 38, wherein said resistance value for a defined frequency at a defined location is the average amplitude or amplitude sum of all or a subset of said amplitude peaks identified at said frequency and said location.

41. The method of claim 38, wherein said resistance value for a defined frequency at a defined location is the product of (a) the peak count or peak density and (b) the peak amplitude sum of all or a subset of said amplitude peaks identified at said frequency and said location.

42. The method of claim 27, wherein said magnetotelluric data comprises the amplitude of magnetotelluric signals recorded over time at more than one defined location in said area of interest.

43. The method of claim 42, wherein the magnetotelluric signals are sampled over a period of at least about 20 seconds.

44. The method of claim 42, wherein the magnetotelluric signals are sampled over a period of from about 5 seconds to about 60 seconds.

45. The method of claim 42, wherein the magnetotelluric signals are sampled over a period of from about 20 seconds to about 60 seconds.

46. The method of claim 1, wherein the magnetotelluric signals are sampled over a period of at least about 5 seconds.

47. The method of claim 1, wherein the magnetotelluric signals are sampled over a period of at least about 20 seconds.

48. The method of claim 12, wherein the magnetotelluric signals are sampled over a period of at least about 5 seconds.

49. The method of claim 13, wherein the magnetotelluric signals are sampled over a period of at least about 5 seconds.

50. The method of claim 18, wherein the magnetotelluric signals are sampled over a period of at least about 5 seconds.

51. The method of claim 31, wherein the magnetotelluric signals are sampled over a period of at least about 5 seconds.

52. The method of claim 31, wherein the magnetotelluric signals are sampled over a period of at least about 20 seconds.

* * * * *